United States Patent
Budampati et al.

(10) Patent No.: US 11,724,945 B2
(45) Date of Patent: Aug. 15, 2023

(54) SYSTEMS AND METHODS FOR WATER SOFTENER SALT LEVEL DETECTION USING SMART SENSOR

(71) Applicant: Pentair Residential Filtration, LLC, Brookfield, WI (US)

(72) Inventors: Ramakrishna Budampati, Woodbury, MN (US); John Stauch, Minneapolis, MN (US)

(73) Assignee: PENTAIR RESIDENTIAL FILTRATION, LLC, Brookfield, WI (US)

( * ) Notice: Subject to any disclaimer, the term of this patent is extended or adjusted under 35 U.S.C. 154(b) by 257 days.

(21) Appl. No.: 16/789,259

(22) Filed: Feb. 12, 2020

(65) Prior Publication Data

US 2020/0255301 A1    Aug. 13, 2020

Related U.S. Application Data

(60) Provisional application No. 62/805,078, filed on Feb. 13, 2019.

(51) Int. Cl.
*C02F 1/00* (2023.01)
*C02F 1/42* (2023.01)

(52) U.S. Cl.
CPC ............. *C02F 1/008* (2013.01); *C02F 1/42* (2013.01); *C02F 2001/425* (2013.01);
(Continued)

(58) Field of Classification Search
None
See application file for complete search history.

(56) References Cited

U.S. PATENT DOCUMENTS

| 4,987,409 A | 1/1991 | Jackson |
| 5,132,669 A | 7/1992 | Jackson |

(Continued)

FOREIGN PATENT DOCUMENTS

| CN | 100335871 C | 9/2007 |
| CN | 108585117 A | 9/2018 |

(Continued)

OTHER PUBLICATIONS

Extended European Search Report, European Application No. 20157199.9, dated May 19, 2020, 8 pages.

*Primary Examiner* — Richard C Gurtowski
(74) *Attorney, Agent, or Firm* — Husch Blackwell LLP

(57) ABSTRACT

The present disclosure relates to systems and methods for monitoring the fill level of salt in a brine tank of a water softener system. Distance measurements may be taken by a wireless-enabled smart sensor device disposed at an interior surface of a brine tank cover. Calibration of the smart sensor device may include taking distance measurements corresponding to different fill levels of the brine tank, obtaining at least one corresponding user-defined fill ratio, and storing these as calibration data. Subsequent distance measurements may be used to determine a current fill ratio based on the calibration data. If the current fill ratio is below a threshold value, an alert may be sent to the user device indicating that salt should be added. If the current fill ratio is above a previous fill ratio, an alert may be sent to the user device requesting recalibration of the smart sensor device.

16 Claims, 12 Drawing Sheets

(52) U.S. Cl.
CPC .. *C02F 2209/006* (2013.01); *C02F 2209/008* (2013.01); *C02F 2209/42* (2013.01)

(56) References Cited

U.S. PATENT DOCUMENTS

| | | |
|---|---|---|
| 5,147,531 A | 9/1992 | Dougal |
| 6,456,202 B2 | 9/2002 | Johannsen et al. |
| 6,670,810 B2 | 12/2003 | Duncan et al. |
| 6,696,963 B2 | 2/2004 | Zimmerman et al. |
| 6,696,966 B2 | 2/2004 | Bearak |
| 6,954,701 B2 | 10/2005 | Wolfe |
| 7,818,094 B2 | 10/2010 | Rambicourt et al. |
| 8,514,090 B2 | 8/2013 | Witter et al. |
| 8,535,540 B2 | 9/2013 | Chandler, Jr. |
| 8,758,628 B2 | 6/2014 | Quinn |
| 9,791,308 B2 | 10/2017 | Pesz et al. |
| 2004/0103930 A1 | 6/2004 | Lee |
| 2004/0188330 A1 | 9/2004 | Slawson et al. |
| 2005/0068186 A1 | 3/2005 | Wanie |
| 2006/0114593 A1 | 6/2006 | Sagaert |
| 2008/0047881 A1 | 2/2008 | Buck et al. |
| 2009/0211984 A1 | 8/2009 | Petty |
| 2010/0332149 A1 | 12/2010 | Scholpp |
| 2012/0078722 A1 | 3/2012 | Van Oosterwijck |
| 2013/0284649 A1* | 10/2013 | Tucker .................... C02F 1/505 210/139 |
| 2016/0292990 A1* | 10/2016 | Pesz .................... G01F 23/2928 |
| 2018/0052033 A1 | 2/2018 | Pesz et al. |
| 2018/0075399 A1 | 3/2018 | Agarwal et al. |
| 2018/0375680 A1 | 12/2018 | Wright et al. |

FOREIGN PATENT DOCUMENTS

| | | |
|---|---|---|
| DE | 2911366 A1 | 10/1980 |
| EP | 2045216 A1 | 4/2009 |
| WO | 2018220571 A1 | 12/2018 |

* cited by examiner

SYSTEMS AND METHODS FOR WATER SOFTENER SALT LEVEL DETECTION USING SMART SENSOR

CROSS REFERENCE TO RELATED APPLICATIONS

This application claims priority to U.S. Provisional Application No. 62/805,078, filed Feb. 13, 2019, which is incorporated herein by reference in its entirely.

BACKGROUND

Water supplied to a home or business, whether through a well or a municipal water supply, may be used in a variety of applications such as drinking, cooking, showers, baths, toilets, pools, agricultural maintenance, and even heat. In some regions, high mineral content causes water to be "hard," causing mineral buildup in pipes, reducing flow to taps and appliances, and leaving filmy residue on washed items such as dishes or vehicles. In order to reduce the mineral content of water, a water softener may be installed in a home or business, which extracts minerals from the water using an ion exchange process in which minerals in the water are exchanged for salt. Conventional water softeners include a reservoir, called a brine tank, which stores salt used in the ion exchange. Salt must be manually added to the brine tank periodically, as salt is consumed in the water softening process. As salt consumption tends to vary with water usage, it may be difficult for a home or business owner to predict when the brine tank should be refilled without the inconvenience of regularly performing a visual inspection of the brine tank to assess the salt level.

SUMMARY

In light of the deficiencies described above, new systems and methods for providing the ability to monitor the salt level of the brine tank of a water softener system of a home or business and to electronically alert the home or business owner when the brine tank should be refilled with salt are desirable.

Some embodiments provide a system for monitoring the salt level of a brine tank. The system can include a water softener, a sensor device, and a remote server. The water softener can include a brine tank with a cover. The sensor device can be attached to the interior of the cover of the brine tank. The sensor device can include an adhesive layer that attaches the sensor device to the cover, a sensor that is configured to measure distance along a principal axis, and a wireless transceiver configured to communicatively connect to a user device and a gateway device. The remote server can be configured to communicatively connect to the user device and to the wireless transceiver of the sensor device through the gateway device. The remote server can include a processor configured to execute instructions for: receiving, from the sensor device, a first distance measurement corresponding to a current fill level of the brine tank; receiving, from the sensor device, a second distance measurement corresponding to a maximum fill level of the brine tank; and receiving, from the user device, at least one user-defined fill ratio of the current fill level to the maximum fill level.

In some forms, the processor of the remote server is further configured to execute instructions for: receiving a third distance measurement from the sensor device; and determining a new fill ratio for the brine tank based on the first distance measurement, the second distance measurement, the third distance measurement, and the at least one user-defined fill ratio. The processor of the remote server can be further configured to execute instructions for: determining that the new fill ratio is less than a predetermined threshold value; and sending a prompt to the user device, the prompt requesting that salt be added to the brine tank. The processor of the remote server can be further configured to execute instructions for: determining that salt has been added to the brine tank; and sending a prompt to the user device, the prompt requesting recalibration of the sensor device. The processor of the remote server can be further configured to execute instructions for: storing calibration data that includes the first distance measurement; the second distance measurement; and the at least one user-defined fill ratio. The processor of the remote server can be further configured to execute instructions for averaging the distance measured by each of the sensors in the array of sensors.

In some forms, the sensor device includes a microcontroller electrically coupled to the sensor and the wireless transceiver, and a memory device configured as a non-transitory computer readable medium. The microcontroller can be configured to execute instructions for routing calibration data to be stored at the memory device, the calibration data including one or more of the first distance measurement, the second distance measurement, and the at least one user-defined fill ratio. In some forms, the sensor is one or more of an ultrasound distance sensor, an infrared light distance sensor, or an image sensor. The sensor device can also include an adjustable base configured to adjust an angle of the principal axis with respect to the interior of the cover of the brine tank. The sensor can be an array of sensors, each sensor in the array of sensors being configured to measure distance and at least one of the sensors in the array of sensors being configured to measure distance along the principal axis. In some forms, the principal axis is substantially perpendicular to the cover to which the sensor device is attached.

Some embodiments provide a method of monitoring the salt level of a brine tank. The method can include measuring a first distance measurement with a sensor device, the first distance measurement corresponding to a distance between a container cover of a brine tank and a first calibration fill level of salt in the brine tank. The method can also include measuring a second distance measurement with the sensor device, the second distance measurement corresponding to a distance between the container cover of the brine tank and a maximum fill level of salt in the brine tank. The method can include receiving a first user-defined fill ratio corresponding to the first distance measurement. The method can include measuring a third distance measurement with the sensor device, the third distance measurement corresponding to a distance between the container cover of the brine tank and a first current fill level of salt in the brine tank. The method can also include determining a first new fill ratio based on the first distance measurement, the second distance measurement, the first user-defined fill ratio, and the third distance measurement. The method can include comparing the first new fill ratio to a predetermined threshold value. The method can include sending an alert to a user device, the user device being in communication with the sensor device, when the first new fill ratio is below the predetermined threshold value.

In some forms, the method includes the step of receiving a second user-defined fill ratio corresponding to the second distance measurement. The method can also include sending an alert to the user device, the alert requesting recalibration of the sensor device. The step of sending an alert to the user device, the alert requesting recalibration of the sensor device can be performed when the first new fill ratio is above the first user-defined fill ratio.

In some forms, the method can also include measuring a fourth distance measurement with the sensor device, the fourth distance measurement corresponding to a distance between the container cover of the brine tank and a second calibration fill level of salt in the brine tank. The method can include measuring a fifth distance measurement with the sensor device, the fifth distance measurement corresponding to a distance between the container cover of the brine tank and the maximum fill level of salt in the brine tank. The method can include receiving a second user-defined fill ratio corresponding to the fourth distance measurement. The method can include measuring a sixth distance measurement with the sensor device, the sixth distance measurement corresponding to a distance between the container cover of the brine tank and a second current fill level of salt in the brine tank. The method can include determining a second new fill ratio based on the fourth distance measurement, the fifth distance measurement, the second user-defined fill ratio, and the sixth distance measurement. The method can also include comparing the second new fill ratio to the predetermined threshold value. The method can also include sending the alert to the user device to add salt to the brine tank when the second new fill ratio is below the predetermined threshold value.

In some forms, the second new fill ratio is further based on the first distance measurement, the second distance measurement, the first user-defined fill ratio, and the third distance measurement. The method can include sending a prompt to the user device, the prompt requesting input of the first user-defined fill ratio corresponding to the first distance measurement after the first distance measurement is measured. Before the step of measuring the second distance measurement with the sensor device, the method can also include sending a prompt to the user device requesting that a user position an object along a principal axis of the sensor device at a distance away from the container cover corresponding to the distance between the container cover of the brine tank and the maximum fill level of salt in the brine tank. The method can include storing at least one of the first distance measurement, the second distance measurement, the third distance measurement, the fourth distance measurement, the fifth distance measurement, the sixth distance measurement, the first user-defined fill ratio, or the second user-defined fill ratio at a non-transitory computer readable medium.

DESCRIPTION OF THE DRAWINGS

The invention will be better understood and features, aspects and advantages other than those set forth above will become apparent when consideration is given to the following detailed description. Such detailed description makes reference to the following drawings.

DETAILED DESCRIPTION

Figure 1:
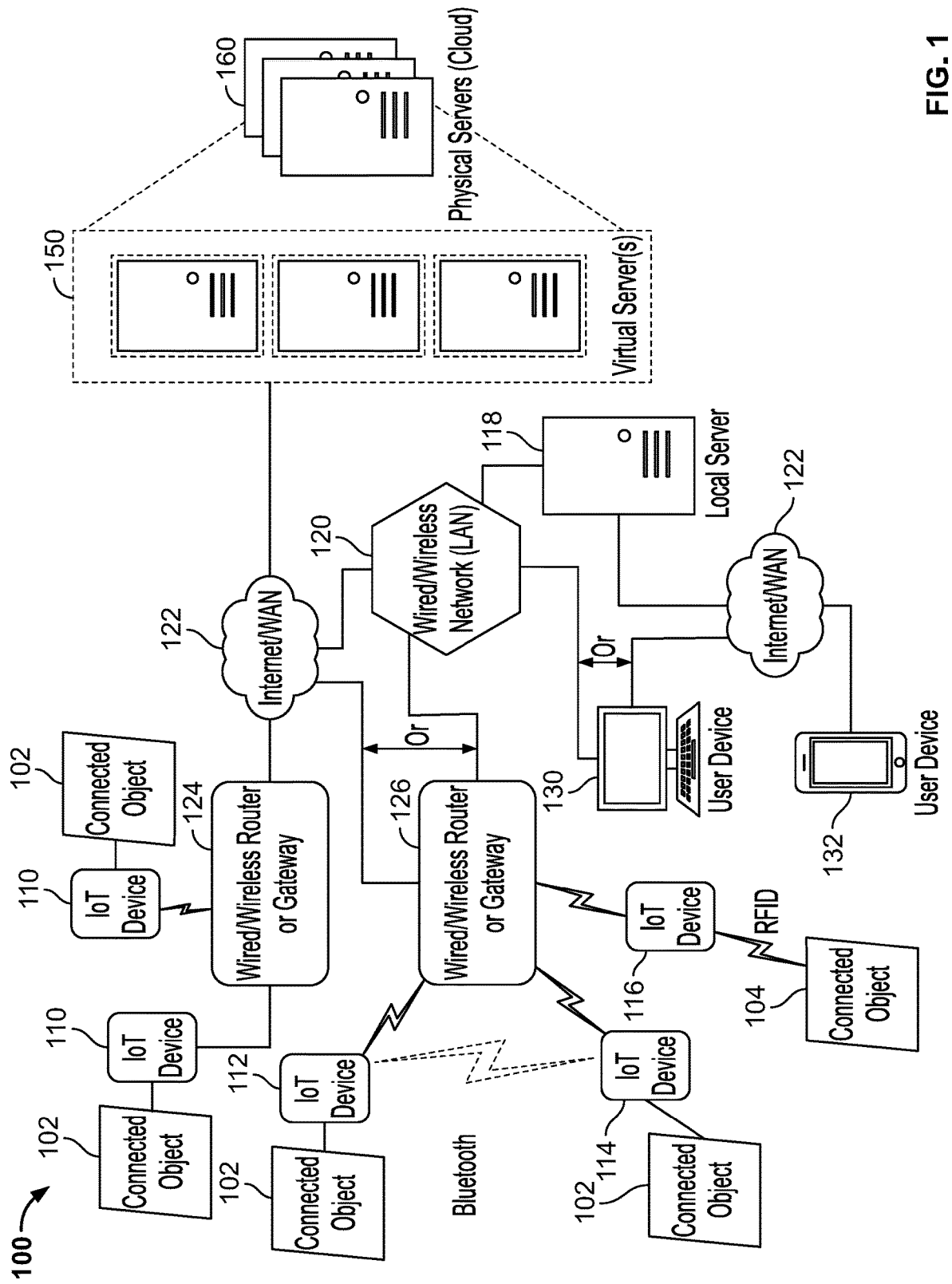
FIG. 1 is a diagram of a computing environment for deploying Internet of Things (IoT) devices in accordance with various embodiments of the invention.

Before any embodiments are described in detail, it is to be understood that the invention is not limited in its application to the details of construction and the arrangement of components set forth in the following description or illustrated in the following drawings, which is limited only by the claims that follow the present disclosure. The invention is capable of other embodiments, and of being practiced, or of being carried out, in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following description is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. Skilled artisans will recognize the examples provided herein have many useful alternatives and fall within the scope of embodiments of the invention.

Additionally, while the following discussion may describe features associated with specific devices, it is understood that additional devices and or features can be used with the described systems and methods, and that the discussed devices and features are used to provide examples of possible embodiments, without being limited.

FIG. 1 illustrates an example computing environment 100 for wired and/or wireless monitoring and control of electronic and mechanical devices that are deployed in a physical environment, such as a home or residential environment, a commercial building, a farm or other agricultural facility, industrial environments such as factories and refineries, and any other physical environment where it is feasible and beneficial to deploy so-called "smart" devices, which are natively or retroactively enabled to connect to the internet or another wide-area network (WAN) 122 to send and receive electronic data. In particular, such devices become "connected objects" 102, 104 in the computing environment 100 by interfacing with an internet enabled device, referred to herein as an "Internet-of-Things" (IoT) device, in accordance with various embodiments described herein. Other significant entities, such as a person, an animal (e.g., a farm animal), a pipe or pipeline, a body of water, or the physical environment itself, may become a connected object 102, 104 in the computing environment 100 by interfacing with an IoT device. The interface or connection between a connected object 102, 104 and an IoT device 110, 112, 114, 116 may depend on several factors, non-limiting examples of which include: whether the object is electronic, mechanical, organic, etc.; whether the object is "natively" connected, having the IoT device or another transmitter built-in, or the IoT device is added or connected to the object to make the object "connected;" whether the IoT device connects directly to the connected object, and/or connects to other objects or must be disposed in a particular location (e.g., to deploy a sensor); and, whether the IoT device sends data to the connected object, receives data from the connected object, or both. Example interfaces/connections are described below with respect to FIGS. 1 and 2.

Each of the IoT devices 110-116 may be embedded with electronics, software, sensors, actuators, and network connectivity, either within the device itself or in cooperation with connected servers 118, 160, which enable the IoT devices 110-116 and their embedded software to collect and exchange data. In some embodiments, various IoT devices 110-116 in an environment 100 may send and/or receive data transmissions over a WAN 122, a local area network (LAN) 120, and/or another communication network using any suitable communication protocol. For example, the IoT devices 112-116 may communicate over the LAN 120 with a local server computing device 118, such as in a private network where transmitted data to/from the IoT devices is isolated from the internet or another WAN 122, at least until the data is processed by the local server 118. In some embodiments, (a) local server(s) 118 may be operated at the same location as the IoT devices 112-116, such as at a residence or in an office building. A user device 130 may also be connected to the LAN 120 in order to access the IoT data as described below; alternatively, IP connectivity may be used, connecting the LAN 120 and/or the local server(s) 118 to the Internet or another WAN 122, so that local and/or remote user devices 130, 132 can access the local server 118.

In still other embodiments, IoT devices 110-116 may connect, directly or through a router, gateway, base station, etc. (shown as wired/wireless router or gateway 124, 126), to the WAN 122 in order to communicate with cloud-based computing resources. Such an environment provides a bi-directional, direct-to-cloud communication between the IoT devices 110-116 and one or more application and/or hosting servers. In some embodiments, IoT devices 110-116 may communicate with and directly use the resources of one or more physical, remote server computing devices 160, which may be deployed in one or more data centers (for example) in a particular geographic location or dispersed throughout several geographic locations. In other embodiments, the remote physical servers 160 may cooperate to provide virtualized computing resources that can be allocated for use by, for example, an authorized user of a computing resource service provider. Thus, a user that controls, or provides services for, the IoT devices 110-116 may configure and deploy one or more virtual servers 150 that are allocated the use of certain physical computing resources, such as processor cycles, memory, data storage, etc., of the physical servers 160; the IoT devices 110-116 may, in turn, be configured to connect to the virtual servers 150. For example, an IoT device 110 may be programmed to connect to an IP address associated with an endpoint that connects a virtual network adapter of the servers 150 to a physical network adapter of the physical servers 160. The virtual servers 150, or the computing resource service provider's computing environment in which the virtual servers 150 are deployed, may provide other computing resource services for implementing an IoT platform as described further below.

Given this bi-directional, cloud-based environment, each IoT device 110-116 may be deployed as a direct-to-cloud IoT device. In other words, the deployment of multiple IoT devices 110-116 in a LAN-based or cloud-based environment provides for an internetworking of physical devices, connected devices, and/or smart devices at the network level. Various communication protocols between components may be used, depending on the types of devices connecting to each other and the type, amount, and frequency of data being exchanged. Non-limiting examples of connection protocols include: an IoT device 110, such as a base station or fixture, may have a wired (e.g., CAT5, USB) connection to a router 124 and may use any TCP/IP protocol for wired connections; or, an IoT device 110 may have a wireless connection to a router 124, and may use wireless TCP/IP protocols such as WiFi or MQTT; an IoT device 112 may communicate directly with another IoT device 114 using the above wireless protocols or other suitable protocols such as Bluetooth; IoT device 110-114 connections to a connected object 102 may be wired, or may be indirect based on a sensor interface; or, an IoT device 116 may connect wirelessly to the connected object 104, using a suitable protocol such as RFID for an RFID-enabled connected object 104. More generally, a communication network can include a Wi-Fi network (e.g., an 802.11x network, which can include one or more wireless routers, one or more switches, etc.), a peer-to-peer network (e.g., a Bluetooth network, a ZigBee® network, a Z-Wave® network, a proprietary RF connection, etc.), a cellular network (e.g., a 3G network, a 4G network, etc., complying with any suitable standard, such as CDMA, GSM, LTE, LTE Advanced, WiMAX, etc.), a wired network, an EnOcean® network, etc. In some embodiments, the communication network can be a LAN, a WAN, a public network (e.g., the Internet), a private or semi-private network (e.g., a corporate or university intranet), any other suitable type of network, or any suitable combination of networks. Communication links between the IoT devices 110-116, the router/modem 124, 126, the local server 118, the LAN 120, the cloud based server(s) 160, and/or the virtual server(s) 150, can each be any suitable communications link or combination of communications links, such as wired links, fiber optic links, Wi-Fi links, Bluetooth links, cellular links, etc.

A user may operate one or more client computing devices 130, such as a desktop or laptop computer, or a mobile computing device 132 such as a phone or tablet, running client software that enables the device 130, 132 to access an interface to the IoT platform provided by a server 118, 150, 160. Each of these client computing devices 130, 132 may include at least one processor executing specific computer-executable instructions (i.e., the running software) stored in a memory coupled to the client computing device 130, 132. The user may access and run a client-based software such as a web browser or web application, in order to request access to the system level software and/or a GUI (e.g., by entering a Uniform Resource Locator (URL) for a web page including the GUI). This request may identify the IP address for the server(s), as well as instructions to generate and render the GUI and/or web page for the system level software. The server(s) may execute one or more software instructions to generate and render the GUI, and transmit it to the client computing device 130, 132 for display. The server(s) 118, 150, 160 may include components and data processing capabilities used to host and run software applications that allow for bi-directional communication between each IoT device 110-116 and the server(s) 118, 150, 160. For example, the server(s) 118, 150, 160 may host the customizable software that is deployed to, and installed on, each IoT device 110-116. The server(s) 118, 150, 160 may also run the software and protocols for other services used by the IoT platform, as well as for the interface to the client computing devices 130, 132. Example uses of the user interface to the IoT platform include configuring and deploying server resources, configuring and deploying software and settings for IoT devices, obtaining and/or reviewing data collected by the server(s) from the IoT devices 110-116 (e.g., viewing current status), performing and/or reviewing data analysis, accessing particular IoT devices 110-116, etc.

Figure 2:
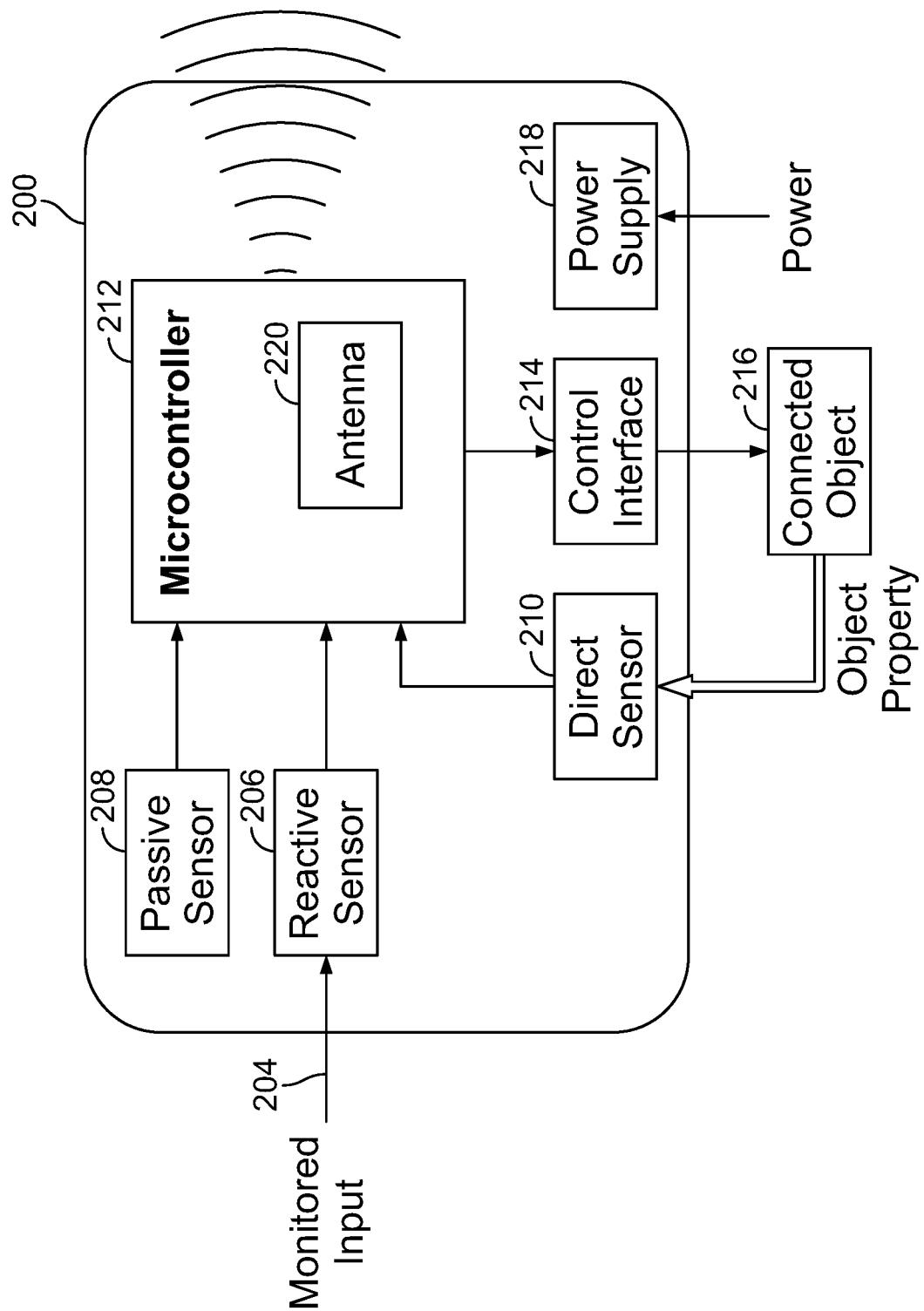
FIG. 2 is a block diagram of an example embodiment of an IoT device.

FIG. 2 shows the internal (i.e., partially or fully inside a housing) components of an example IoT device 200 in accordance with some embodiments of the invention (e.g., as an example of one or more of the IoT devices 110-116 of FIG. 1). As shown in FIG. 2, an IoT device 200 may serve to both collect data associated with a connected object 216, and control one or more operations and/or operating parameters of the connected object 216; in other embodiments, an IoT device for the connected object 216 may only collect and report data, or only control operations/configurations of the connected object 216. To collect data associated with the connected object 216, the IoT device 200 may include, connect to, or communicate with one or more of several different types of sensors. Non-limiting examples of types of sensors that may cooperate with or be incorporated in the IoT device 200 include reactive sensors 206, passive sensors 208, and direct sensors 210, among others. A reactive sensor 206 can detect and report certain monitored inputs 204 on the connected object 216 or the IoT device 200 itself; examples include a pressure transducer that detects a button press or a fluid pressure level, a moisture sensor, a flow rate sensor, a photodiode or other light receptor, and a sample analyzer that collects a sample (e.g., of water in which the sensor 206 is submerged) and measures a property of the sample (e.g., total dissolved solids; note that a sample analyzer may also be a direct sensor 210 if the connected object 216 is a body of water (as opposed to a water filter in the body of water)). A passive sensor 208 can detect environmental and other ambient properties; examples include an ambient temperature sensor, an ambient light sensor (e.g., for sunlight), a humidistat, etc. A direct sensor 210 can be connected to the connected object 216, or in communication therewith, or otherwise oriented to monitor one or more specific properties of the connected object 216; examples include a thermistor for monitoring the temperature of the connected object 216, a biometric sensor, a sample analyzer (e.g., of water at the inlet or outlet of a water filter), a current sensor, a speed sensor, etc.

Any of the sensors 206-210 may be configured to monitor a corresponding property continuously, at intervals, or randomly, and/or may "listen" for inputs and react when they are detected. Sensors 206-210 may also continuously generate data, or may only generate data at intervals, or only when the monitored property meets one or more particular threshold values; the generated data may describe the state of the property being measured. The sensors 206-210 may send the data to a microcontroller 212 of the IoT device 200. A microcontroller 212 may be any suitable microprocessor, including single- and multi-core CPUs, wireless-enabled microcontrollers, and other known microcontrollers having the processing power to receive data from the sensors and transmit the data to a receiving device such as a gateway/router or a local or cloud server. In some embodiments, the microcontroller 212 can be configured to itself act as a wireless gateway module. For example, the microcontroller 212 can be implemented using a single-chip wireless microcontroller, such as the CC3200MOD microcontroller available from Texas Instruments® (of Dallas, Tex.), which can include a CC3200R1M2RGC microcontroller from Texas Instruments®. A microcontroller 212 may further have sufficient computing power to receive control commands from a router/gateway, a server, another IoT device, or a client computing device, and deliver the control commands to the connected object 216 as described below. The microcontroller 212 may further have sufficient resources to store and execute data analysis algorithms, such as processing methods that enable the microcontroller 212 to evaluate sensor 206-210 data and issue control commands to the connected object 216 based on the evaluated data. For example, the microcontroller 212 and/or the IoT device 200 can include any suitable volatile memory, non-volatile memory, storage, or any suitable combination thereof. For example, the memory can include RAM, ROM, EEPROM, one or more flash drives, one or more hard disks, one or more solid state drives, one or more optical drives, etc. In some embodiments, the memory can have encoded thereon a computer program for controlling operation of a hardware processor (e.g., microcontroller 212) in the form of computer executable instructions that, when executed by the hardware processor, cause the hardware processor to perform one or more actions as indicated by the instructions.

In some embodiments, the microcontroller 212 or the IoT device 200 can include one or more antennas 220 configured to send and/or receive wireless signals, such as signals for communicating over Wi-Fi, Bluetooth, ZigBee, Z-Wave, free-space optical, etc. In some such embodiments, the antenna(s) 220 can receive signals from the wireless gateway module, and can transmit the signals to the microcontroller 212 for processing into commands. Additionally or alternatively, the antenna 220 can send signals generated by the microcontroller 212 to the wireless gateway/router. In some embodiments, the antenna(s) 220 can be an integral part of the microcontroller 212. Alternatively, in some embodiments, the antenna 220 can be mounted to a printed circuit board (PCB) and electrically connected to the microcontroller 212, and/or can be mounted to a housing of the IoT device 200. In some embodiments, the IoT device 200 can communicate with server(s) and/or other IoT devices in the network using the antenna(s) 220. For example, the IoT device 200 can use the antenna(s) 220 to communicate using a direct connection (e.g., over a Bluetooth connection, over a direct Wi-Fi connection such as an ad hoc Wi-Fi connection or Direct Wi-Fi connection), and/or an indirect connection (e.g., over a LAN, over a mesh network, etc.).

In some embodiments, the IoT device 200 can include a control interface 214 that enables the IoT device 200 to control operations and/or to change configuration settings or other data of the connected object 216. The control interface 214 may include any suitable electrical and/or electronic components and connections needed to enable the desired control of the connected object 216. For example, a control interface 214 for a water pump can connect to the power supply circuit of the pump and, based on signals from the microcontroller 212, selectively provide power for operation of the pump. In this example, the control interface 214 or the IoT device 200 can be connected to both a source of power (e.g., a household electrical grid) and wires/cable(s) connected to the pump, and can either provide power to the pump or inhibit power from being provided to the pump. The microcontroller 212 may provide the appropriate format of signal to cause the control interface 214 to apply the desired control. For example, in an analog environment such as the pump power control, the control interface 214 may be a series of switches, and the microcontroller 212 may send one or more signals that open or close the switches as needed to apply the desired power setting. In another example, the connected object 216 may be a digital device, and the control interface 214 may be an API that converts the microcontroller 212 control signals to function calls that the control interface 214 sends to the connected object 216 to change its operating parameters.

In some embodiments, the IoT device 200 can include a power supply 218 that can provide power for operation of the microcontroller 212 and/or any other suitable low voltage devices within the IoT device 200. For example, the IoT device 200 can receive input power at 230 V and 60 Hertz (Hz), which is not suitable for operation of the microcontroller 212, which is typically a low voltage device (e.g., operating at 3.3 V DC, 5 V DC, 12 V DC, 24 V DC, etc.). In some embodiments, power supply 218 can receive AC power (e.g., at 230 V, 60 Hz), convert the AC power to low voltage DC power, and distribute power to one or more other components of the IoT device 200, such as the microcontroller 212. In other embodiments, the power supply 218 may be one or more onboard batteries (e.g., AAA batteries) contained within the housing of the IoT device 200. Power supply 218 may provide power in a variety of other ways, for example, from harvested energy, wirelessly through inductive coupling or resonant inductive coupling, or in any other known way. In some embodiments, the power supply 218 or another energy storage device such as a battery, an ultracapacitor, a fuel cell, etc., can provide supplemental power to continue to operate the IoT device 200 when an external power supply is interrupted or a primary battery fails.

Figure 3:
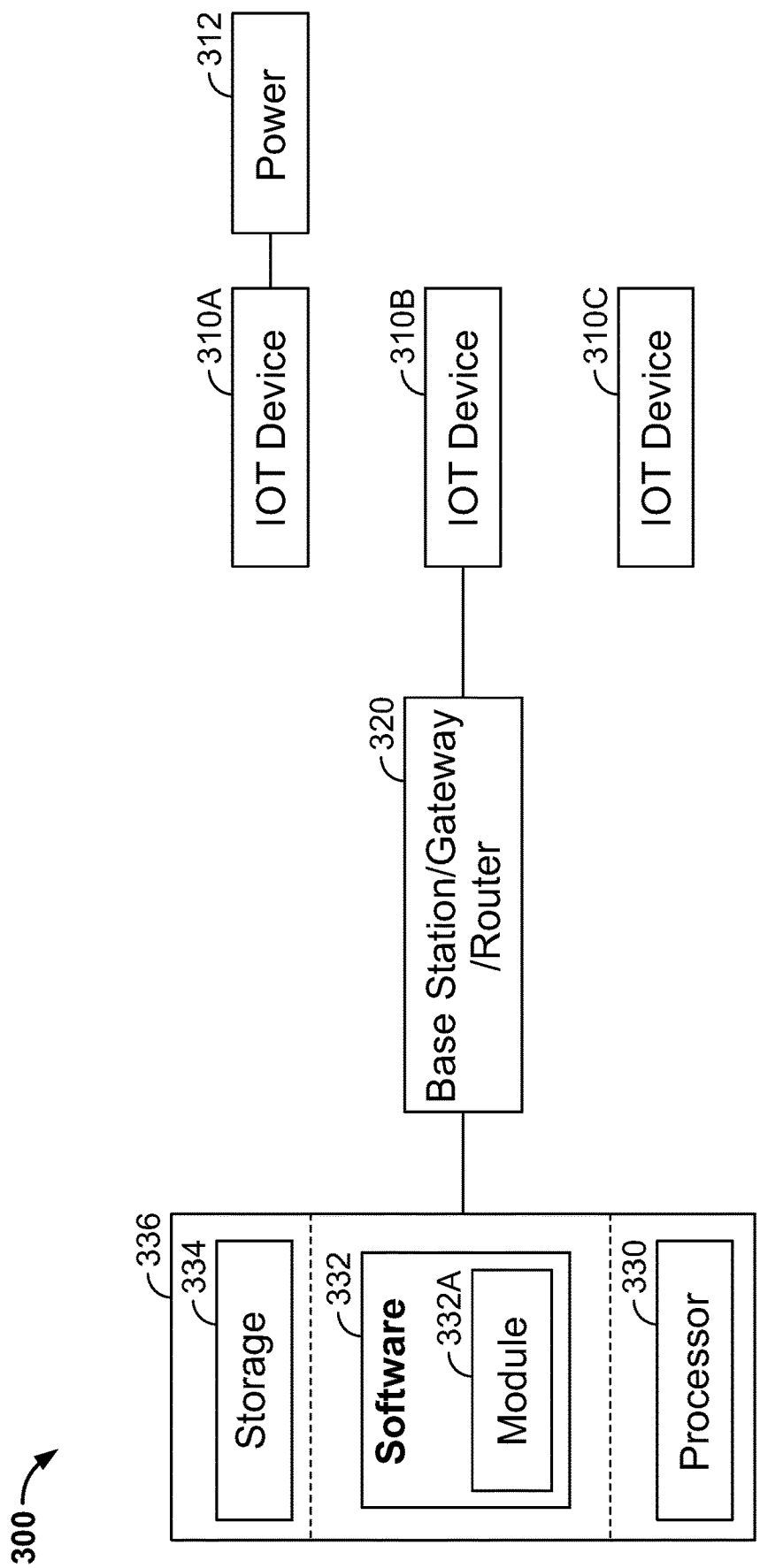
FIG. 3 is a block diagram of an example embodiment of a system in accordance with embodiments of the invention, including a server and IoT devices.

FIG. 3 is a block diagram 300 that illustrates additional details of a communication system. Block diagram 300 includes IoT devices 310A-C, a power source 312, a base station, router, or gateway 320, a server 336, a processor 330, software 332, and storage 334.

As described above, IoT devices 310 may sense data about the environment and/or users and/or a connected object; an IoT device 310A-C can provide raw sensor data and/or processed sensor data to server 336 via gateway 320. Additionally or alternatively, IoT devices 310 may receive data, such as control signals generated by server 336 or a client computing device or sensor data from other IoT devices, from server 336 via gateway 320. IoT devices 310 may communicate with gateway 320 through a wired (e.g., IoT device 310B) or wireless connection. IoT device 310B may also receive power through its wired connection with gateway 320; IoT device 310A receives power from power source 312; IoT device 310C does not have a separate power source and may instead rely on piezoelectric technology or other technology to provide sufficient energy for transmitting information to gateway 320. Depending on the embodiment, IoT devices 310 may employ a range of technologies. For example, IoT devices 310 may detect heat or pressure changes, may detect touch, or may detect changes in a variety of health indicators. Certain IoT devices 310 may rely on Bluetooth, iBeacon, or near field communication technology. In some embodiments, IoT devices 310 may include an accelerometer. IoT devices 310 may be present in a variety of locations within an organization's environment. IoT devices 310 may be embedded in an article of furniture, such as a chair or table, or may be embedded in or coupled to a wall, partition, ceiling, of floor. IoT devices 310 may also be associated with a user, present, for example, in a user's identification badge or mobile communication device (e.g., a smartphone, in a wrist worn device, etc).

Gateway 320 relays information to server 336 and may be coupled to server 336 via a LAN or wide area network (WAN). Gateway 320 may be any device suitable to receive, aggregate, and/or relay information from IoT devices 310A-C, including, for example, a wireless router or a Room Wizard™. Gateway 320 may include existing technology affiliated with other services of an organization or may be provided to an organization specifically for use with IoT devices 310. For example, a gateway 320 may be a base station comprising computing resources, such as a processor, memory, and specific program instructions (e.g., software or firmware) that the processor executes to communicate with and/or monitor deployed IoT devices 310. In some embodiments, more than one gateway 320 may be used to optimize performance. For example, the number and/or positioning of gateways may depend on the number and/or positioning of IoT devices 310.

As information from one or more IoT devices 310 reaches server 336, software 332 may determine how the information is processed. In this embodiment, a software module 332A can configure a commands processor 330 to perform a variety of tasks, such as processing collected data from IoT devices 310 and/or sending control signals to IoT devices 310 for controlling the corresponding connected object(s). For example, processor 330 may analyze incoming data related to a user's location, orientation, or interaction with a client computing device. Processor 330 may make determinations or conclusions about a user or group of users, or an object or group of objects, or other environmental or input conditions, based on incoming data. Processor 330 may also relay information or send conclusions to a user or group of users. Incoming data from IoT devices 310, other incoming data or inputs, conclusions, and other data may be stored in storage 334.

In various embodiments, server 336 may be a virtual server or may represent a cluster of servers. Some or all portions of the block diagram may be located physically on site at an organization's location and some or all may be stored remotely in the cloud. For example, in one embodiment, server 336 may physically include processor 330 while software 332, software module 332A, and storage 334 are located in a remote or cloud server. In another embodiment, only software 332 or storage 334 may be located in a remote or cloud server. Software module 332A may additionally communicate with a variety of other servers, processors, hardware, and software located in server 336 or in other servers or other locations. For example, software module 332A may communicate with a second server to ensure that a user's calendar or reservation information is up-to-date.

Figure 4:
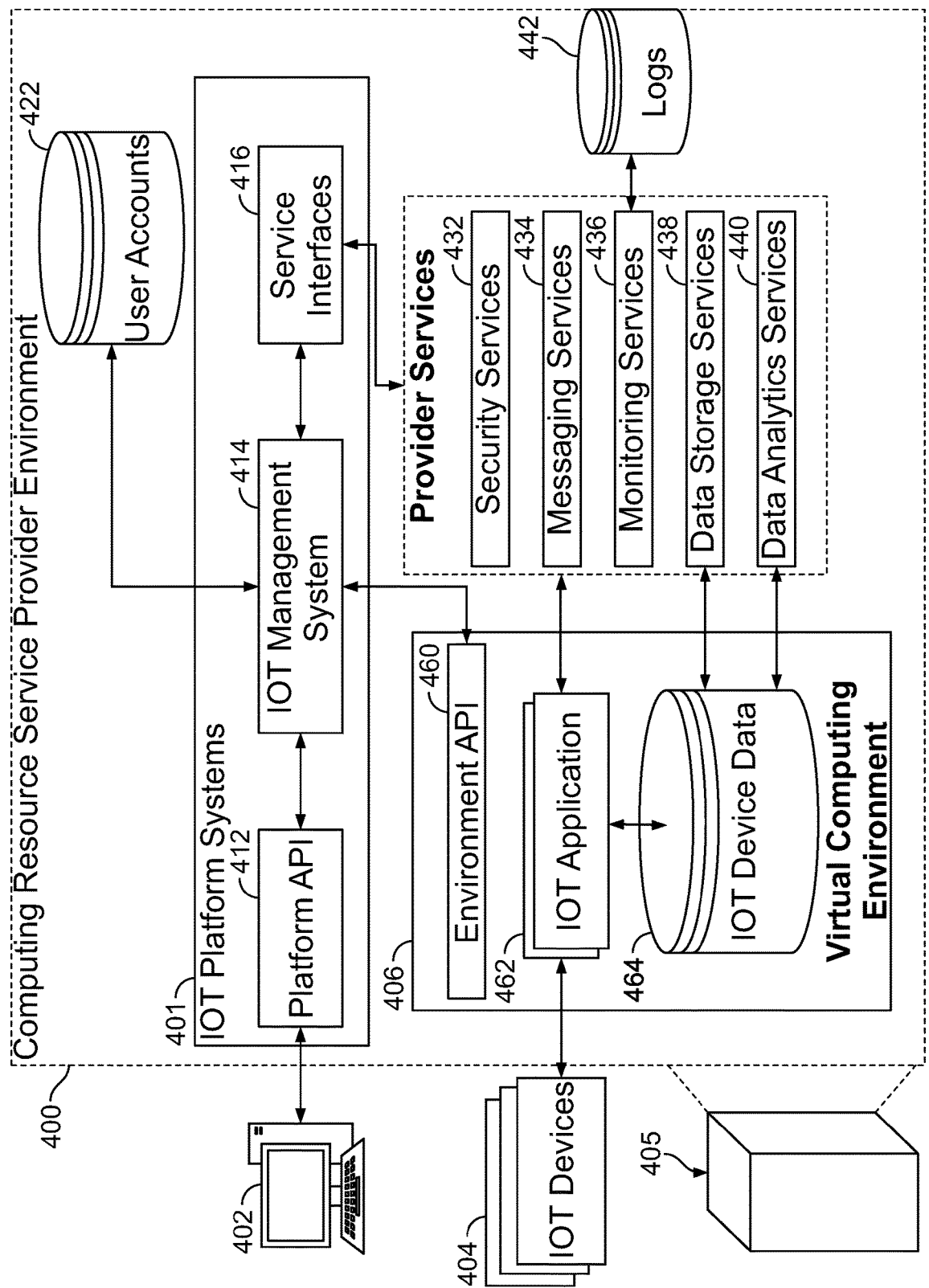
FIG. 4 is a block diagram of an example embodiment of another computing environment in accordance with some embodiments of the invention.

Referring to FIG. 4, embodiments of the invention may operate within or upon computing systems (e.g., hardware computing device 405) of a computing resource service provider that provide a computing environment 400 accessible, via one or more computer networks, by users of user computing devices 402 and by one or more IoT devices 404 configured and deployed as described above. The computing environment 400 may, for example, be provided by the virtual servers 150 and/or the physical servers 160 of FIG. 1 (i.e., computing device 405 may be one of the physical servers 160 of FIG. 1). That is, where FIG. 1 illustrates the conceptual operation of the present systems and methods in interaction, via computing devices 130, 132, with a "client," or administrator of IoT devices 110-116 deployed in a computing environment 100, FIG. 4 illustrates a computing architecture in which a client may access the computing systems of the computing resource service provider environment 400 (e.g., using the client's user account credentials) using a computing device 402 to connect to one or more user interfaces provided (e.g., as websites, web applications, command consoles, APIs, etc.) in the environment 400; the user interfaces may enable the client to manage virtual computing resources allocated to the client's account and configured to implement an IoT platform for the client's IoT devices 404.

The computing resource service provider environment 400 may include one or more systems 401 that cooperate to enable deployment of the IoT platform using a customized configuration for a particular user. The systems 401 may include a platform API 412 to which the client, via user device 102, connects in order to configure, deploy, manage, and otherwise interact with the client's IoT platform. In some embodiments, the platform API 412 provides secure access to an IoT management system 414 that includes or accesses services and data needed to interact with an IoT platform, IoT application 462, and/or IoT devices 404 that are deployed within or connect to the client's virtual computing environment 406, described below. In some embodiments, the IoT management system 414 may access one or more user account data stores 422 that contain user account information and other private information associated with the client's user account. For example, the IoT management system 414 may store and retrieve configuration settings for particular IoT devices 404 and/or IoT applications 462 that the client has previously submitted.

The computing resource service provider implements, within its computing environment 400, at least one virtual computing environment 406 in which users may obtain virtual computing resources that enable the users to run programs, store, retrieve, and process data, access services of the computing resource service provider environment 400, etc. The virtual computing environment 406 may be one of any suitable type and/or configuration of a compute resource virtualization platform implemented on one or more physical computing devices. Non-limiting examples of virtual computing environments 406 include data centers, clusters of data centers organized into zones or regions, a public or private cloud environment, etc. The virtual computing environment 406 may be associated with and controlled and managed by the client. In some embodiments, the virtual computing environment 406 of a particular client may be dedicated to the client, and access thereto by any other user or service of the computing resource service provider environment 400 prohibited except in accordance with access permissions granted by the client. In some embodiments, an environment API 460 may serve as a front-end interface that provides access to the resources of the virtual computing environment 406 based on whether or not requests to access the environment 406 are authorized. For example, the IoT management system 414 may deploy IoT platform-related resources, push configuration changes, and request information about such resources via calls to the environment API 460. Additionally or alternatively, other channels, such as TLS-encrypted data channels, may be enabled to allow data to enter or exit the environment 406 without passing through the environment API 460. For example, an IoT application 462 in the environment 406 may be configured to communicate directly with IoT devices 404 and/or certain services in the computing resource service provider environment 400.

In some embodiments, a client's IoT platform may be deployed by installing one or more IoT applications 462 into the client's virtual computing environment 406. An IoT application 462 may be a software program or suite of software programs including program instructions that enable a processor executing the IoT application 462 to communicate with deployed IoT devices 404, sending and/or receiving data, processing data, and making decisions in accordance with the desired goals and functions of the IoT platform. For example, the IoT application 462 may cause the processor to receive sensor data from the IoT devices 404, process the data to determine whether to take any actions, and then perform any identified action such as reporting the status of connected objects to the client, sending new commands to one or more of the IoT devices 404, storing data (e.g., in an IoT device data store 464), etc. The IoT application may be executed within virtual computing resources allocated to the client's virtual computing environment 406, such as one or more virtual machine instances or logical container instances configured to provide virtualized physical computing resources for the purpose of performing the IoT application's functions. For example, a virtual machine instance may be launched from a software image including the configuration information (e.g., operating system, memory, disk storage, network interface configuration, and software program code) needed to provide an execution environment for the IoT application 462.

The computing resource service provider environment 400 may include data processing architecture that implements systems and services that operate "outside" of any particular user's virtual computing environment and perform various functions, such as managing communications to the virtual computing environments, providing electronic data storage, and performing security assessments and other data analysis functions. These systems and services may communicate with each other, with devices and services outside of the computing resource service provider environment 400, and/or with the virtual computing environments. Services depicted in the figures as inside a particular virtual computing environment 406 or outside all virtual computing environments may be suitably modified to operate in the data processing architecture in a different fashion than what is depicted. The IoT management system 414 may include or communicate with one or more service interfaces 416, such as APIs, that enable the IoT management system 414 and/or other components of a deployed IoT platform (e.g., an IoT application 462) to interact with one or more of these systems and services. Non-limiting examples of provider services that may be invoked or accessed to work in conjunction with the IoT platform include: security services 432 that maintain and apply security policies, access controls, and the like, encrypt and decrypt information, create secure transmission (e.g., TLS) channels, etc.; messaging services 434 that transmit triggering events and other notifications between subscribing users and services, and or/provide queueing services for prioritizing synchronous and asynchronous operations (e.g., API calls); monitoring services 436 that monitor network activity and computing resource usage and generate logs 442 of activity; data storage services 438 that maintain distributed storage devices, databases, etc., and that may maintain and/or obtain data stored in an IoT device data store 464; and, data analytics services 440 that may collect data (e.g., aggregated sensor data) and perform analytics on the data, such as machine learning, trend analysis, general monitoring/alerting, etc.

Figure 5:
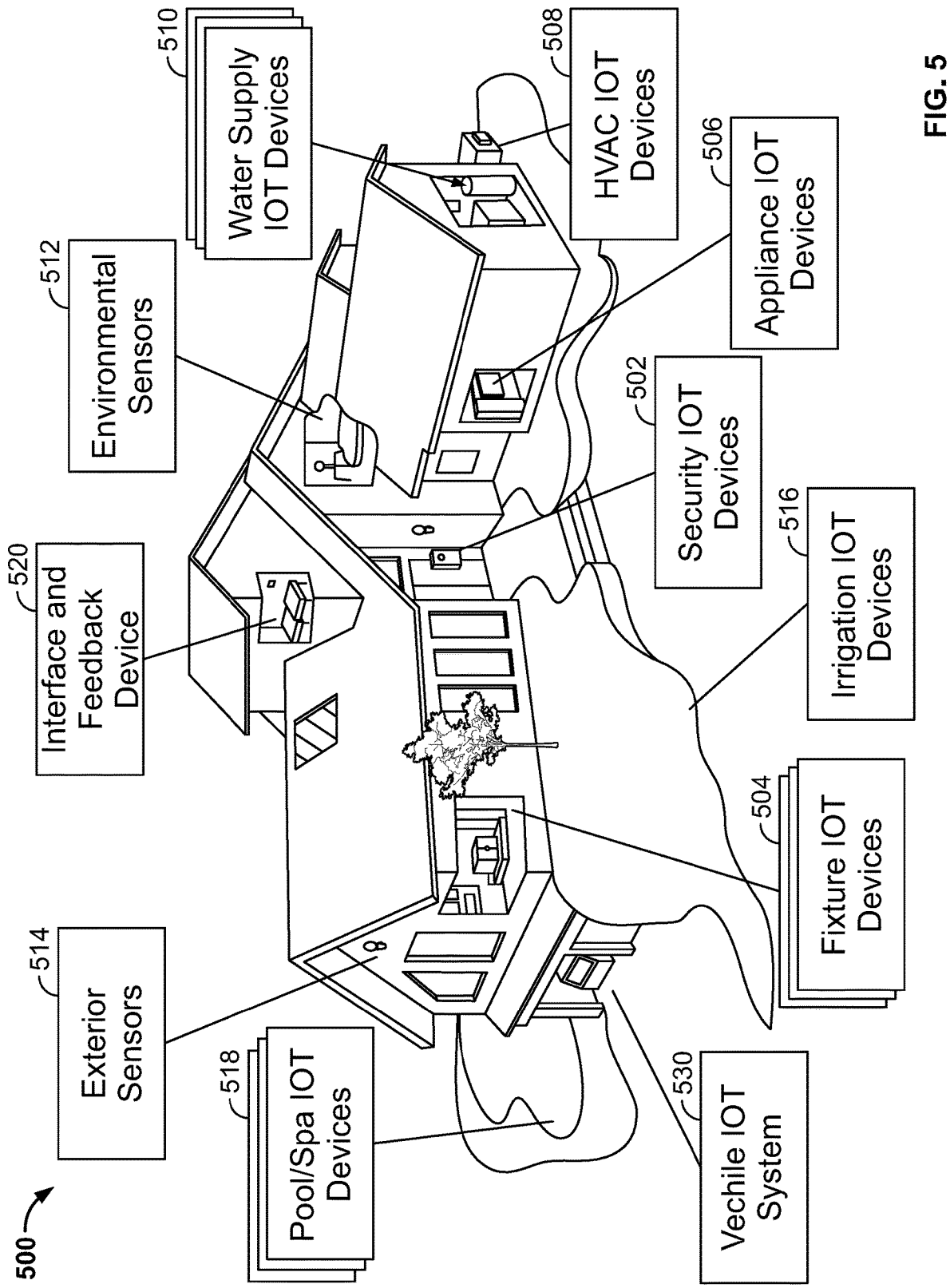
FIG. 5 is a diagram of an example deployment including embodiments of the invention, illustrating a connected residence.

FIG. 5 is a diagram 500 of an example IoT device deployment at a residence in order to create a set of connected objects around the home. The illustrated example IoT devices for connecting to certain objects are not limiting, but are demonstrative of a "smart home" concept where the status can be monitored, and/or operations controlled, for residential devices and systems that historically could only be monitored and controlled manually. Additionally, using the IoT platform described above, together with user interactions and feedback, data from different types of objects and IoT devices may be collected, aggregated, and analyzed to identify previously unknown optimizations, synergies, impacts, and cooperative functionalities between objects in the home. In the illustrated example, the IoT devices may be natively included as a component of the corresponding connected object, or may be retroactively connected (e.g., via sensors and control interfaces as described above) to an unconnected object to connect that object to the IoT platform.

Non-limiting example IoT devices in the diagram 500 include: security IoT devices 502 that monitor home activity, such as smart doorbells, indoor and outdoor video cameras, security/alarm systems, etc.; fixture IoT devices 504 for connecting to "analog" home fixtures, such as faucets and other plumbing; appliance IoT devices 506 for connecting to in-home appliances such as televisions, washers and dryers, refrigerators, dishwashers, garbage disposals, coffee makers, etc.; HVAC IoT devices 508 for connecting to air conditioning units, heating units, vents, etc.; water supply IoT devices 510 for connecting to water heaters, water softeners, water filtration systems, water and sewer pipes, sump pumps and other water pumps, etc.; interior environmental sensor devices 512 such as motion detectors, light detectors, sound detectors, smoke detectors, carbon monoxide detectors, thermostats, etc.; exterior sensor devices 514 such as light and motion detectors, rain sensors, wind sensors, etc.; irrigation IoT devices 516 for connecting to watering system control panels, valves, water lines, areas of earth/soil, etc.; and, pool and spa IoT devices 518 for connecting to pool controls, pool pumps, pool lights, the pool/spa itself, etc. Some or all of the IoT devices 502-518 may collect and send data to a gateway, router, or base station in the home, or directly to a cloud-based server; configuration and control commands may be transmitted in the opposite direction.

The deployment may further include one or more IoT platform interface/feedback devices 520, such as a resident's desktop PC or smartphone having software or a browser interface executing thereon to access the IoT platform and monitor, configure, control, add, remove, change, and perform other management operations on the IoT devices 502-518 and/or interact with collected and analyzed data. The IoT platform may further include a vehicle IoT system 530 installed in the resident's vehicle. In some embodiments, the installation may include a user interface similar to that of the feedback device 520, installed on a computer of the vehicle and presented, e.g., on a navigation screen or another display device. Additionally or alternatively, the vehicle IoT system 530 may include one or more IoT devices that monitor and/or control various properties of the vehicle, such as motor speed and temperature, fuel/battery level, interior temperature, ignition, etc.

Figure 6:
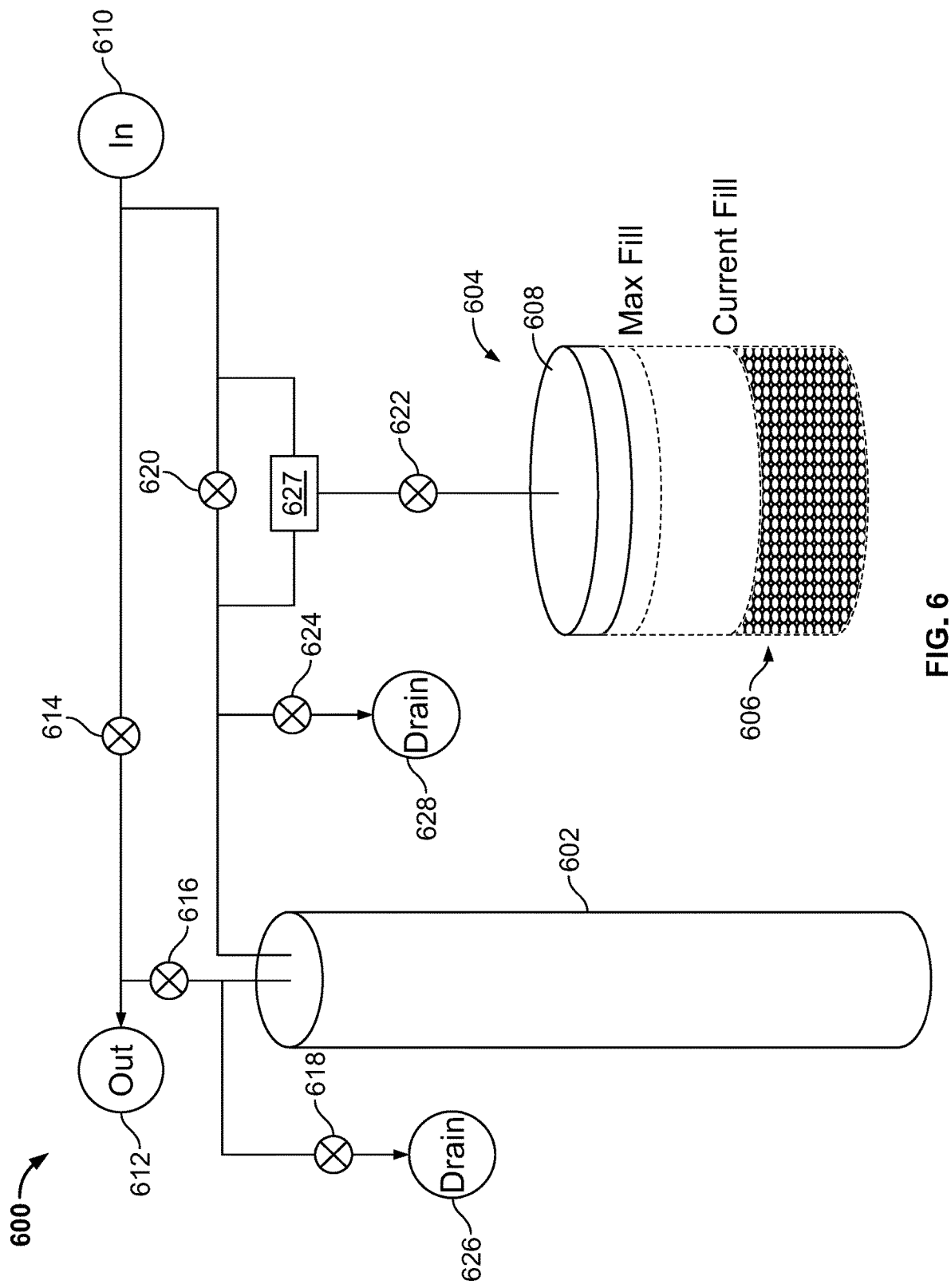
FIG. 6 is a block diagram of an example embodiment of a water softener system.

FIG. 6 shows an illustrative water softener system 600 that includes a softening tank 602, a brine tank 604, and valves 614, 616, 618, 620, 622, and 624. The valves 614, 616, 618, 620, 622, and 624 may be selectively opened and closed based on signals received from a controller (not shown). Hard water is delivered to the system 600 through an inlet line 610 and treated water is output by the system 600 through an outlet line 612. The valve 614 is interposed between the inlet line 610 and the outlet line 612 and may be normally closed. The valve 616 is interposed between the softening tank 602 and the outlet line 612 and may be normally open. The valve 618 is interposed between the softening tank 602 and a drain line 626, and may be normally closed. The valve 624 is interposed between a drain line 628 and the outputs of both the valve 620 and the injector 627, and is normally closed. Hard water may normally be delivered to the softening tank 602 through the valve 620, which is interposed between the inlet line 610 and the softening tank 602 and which may be normally open.

The softening tank 602 may, in cooperation with the brine tank 604, use any suitable water softening technology to produce the treated water from the hard water. For example, the softening tank 602 can include a bed of ion exchange resin particles. Binding sites in the resin bed initially contain positive ions, commonly unipositive sodium or potassium ions. As hard water enters the resin, competition for the binding sites occurs. The di-positive and tri-positive ions in the hard water are favored due to their higher charge densities and displace the unipositive ions. Two or three unipositive ions are displaced for each di-positive or tri-positive ion, respectively. When enough unipositive ions have been displaced from the resin bed, it must be regenerated to resume softening hard water. The regeneration process may include a backwash step, a brining step, and a rinsing step. During the backwash step, the valves 620 and 622 may be closed, while the valves 614 and 624 are opened. Hard water from the inlet line 610 may feed through the open valve 616 into the softening tank 602, and may be forced through the resin bed to exit through the drain line 628. During the brining step, hard water entering the softening tank 602 may pass through an injector 627 to draw a salt solution (sometimes referred to as brine) from the brine tank 604 when the valve 622, which is interposed between the brine tank 604 and the injector 627, is opened and the valve 620 is closed.

The brine tank 604 includes a cover 608 and may be filled with a salt 606, which may be sodium chloride or potassium chloride, for example. The brine tank may include a "MAX FILL" line, which may indicate to a user the maximum amount of salt that should be added when a user is refilling the brine tank with salt. Water in the brine tank 604 may mix with the salt 606 to form a brine, which, when withdrawn, is delivered to the softening tank 602 through the valve 622 and the injector 627. When drawn into the softening tank 602, the brine passes through the resin bed of the softening tank 602 and is output through the valve 618 to the drain line 626. As the brine passes through the resin bed, it replaces di-positive and tri-positive ions in the resin with unipositive ions, to regenerate the resin bed.

During the rinsing step, the brine tank 604 is refilled with water and the resin bed is purged by opening the valves 620, 622, and 618 while the valves 616 and 624 are closed. Hard water may then enter the brine tank 604 through the open valve 622 and may enter the softening tank 602 through the valve 620. Water passing through the softening tank 602 then exits through the drain 626. After the rinsing step, the regeneration of the resin bed is complete, and the valves 614, 618, 624, and 622 may be closed, while the valves 616 and 620 are opened to return the water softening system 600 to a normal operation.

Over time, the level of the salt 606 in the brine tank 604 may lower through repeated regeneration of the resin bed, as the salt 606 is gradually used up in the creation of brine. If the salt 606 of the brine tank 604 is allowed to run out entirely, the water softener system 600 will no longer be able to effectively regenerate the resin bed. It may therefore be desirable to detect when the salt level in the brine tank 604 falls below a predefined threshold value so that a home or business owner associated with the system 600 may refill the brine tank 604 with salt (e.g., before the salt 606 is completely consumed).

Figure 7:
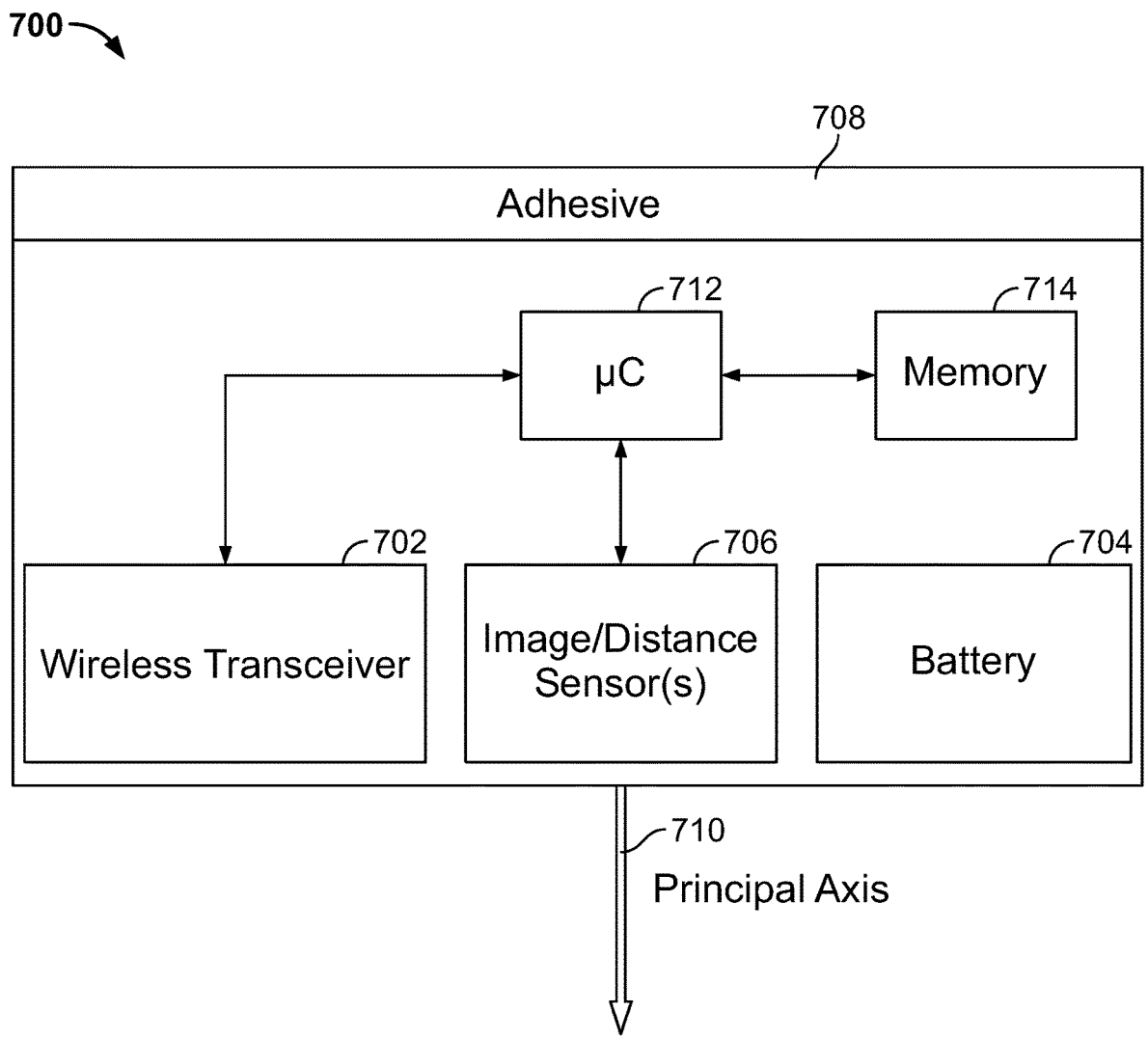
FIG. 7 is a block diagram of an example embodiment of a smart sensor that may detect the salt level in the brine tank of a water softener system.

FIG. 7 shows a smart sensor device 700 that may be attached to a brine tank to determine the salt level of the brine tank. The smart sensor device 700 may include an adhesive layer 708 disposed at a first surface of the smart sensor device, one or more image and/or distance sensors 706 disposed at a second surface of the smart sensor device 700 that is opposite the first surface, a wireless transceiver 702, a memory device 714, a microcontroller 712 that is electrically coupled to the sensors 706, the wireless transceiver 702, and the memory device 714, and one or more batteries 704 that provide electric power to the wireless transceiver 702, the sensors 706, the microcontroller 712, and the memory device 714.

For example, the smart sensor device 700 may be attached to the interior surface of a cover of the brine tank (e.g., the cover 608 of the brine tank 604 of FIG. 6) with the adhesive layer 708. For example, the adhesive layer may include an acrylic adhesive (e.g., as part of a double-sided tape). Alternatively, hook and loop adhesive tape (e.g., Velcro) may be applied to the smart sensor device 700 and the interior surface of the cover of the brine tank to attach the smart sensor device 700 to the cover of the brine tank. In other embodiments, the attachment mechanism may be provided in the form of an interference fit, or other mechanism that allows the smart sensor 700 device to be positioned on an interior surface of the cover 608 of the brine tank 604, in use.

The sensors 706 may include one or more image sensors, infrared distance sensors, and/or ultrasound distance sensors, for example. The sensors 706 may capture measurement data corresponding to a distance along a principal axis 710 that is substantially perpendicular to the cover to which the smart sensor device 700 is attached. As the interior of a brine tank will generally be dark, the sensors 706 may be operational to obtain distance measurements in low light conditions or no light conditions. In some embodiments, one or more of the sensors 706 may include an on-board light source (e.g., a low power light emitting diode (LED)), which may be activated when the sensors 706 obtain measurement data in order to account for the low light or no light conditions of the interior of the brine tank.

For example, for embodiments in which the sensors 706 include an image sensor, the measurement data may include one or more captured images. For embodiments in which the sensors 706 include an infrared (IR) distance sensor, the measurement data may include one or more IR light measurements. For embodiments in which the sensors 706 include an ultrasound distance sensor, the measurement data may include one or more ultrasound measurements. In some embodiments, the microcontroller 712 may analyze a captured image, an IR light measurement, and/or an ultrasound measurement produced by the sensors 706 (e.g., based calibration data stored in the memory device 714) to determine a distance along the principal axis 710 to which the measurements and/or captured image correspond. In alternate embodiments, this analysis may be performed by an external device (e.g., the remote server 818 of FIG. 8).

The microcontroller 712 may route measurement data captured by the sensors 706 to be stored at the memory device 714, which may be a non-transitory computer-readable medium, such as a flash memory. Measurement data stored on the memory device 714 may be subsequently transmitted by the wireless transceiver 702 to an external device (e.g., the remote server 818 of FIG. 8). The wireless transceiver 702 may wirelessly communicate with an external device directly or over an electronic communications network using one or more wireless communication protocols, such as Wi-Fi™ (e.g., according to the IEEE 802.11a, 802.11b, 802.11e, 802.11g, or 802.11n standards) and/or Bluetooth™.

In some embodiments, the smart sensor device 700 may include an adjustable base (not shown). For example, the adjustable base may be expandable on one or more sides of the adjustable base so that the angle of the principal axis 710 of the sensors 706 may be adjusted with respect to the plane of the interior surface of the brine tank to which sensor device 700 is attached. In this way, for brine tanks having covers that are not substantially flat (e.g., that are tapered or angled), the orientation of the sensor device 700 may be adjusted so that the principal axis 710 is substantially perpendicular (e.g., normal) to the top surface of salt within the brine tank. As another example, the base may include a "swivel" functionality and a locking mechanism, allowing smart sensor device 700 to be rotated with respect to its base (e.g., to a desired orientation) before being locked in place (e.g., unable to rotate) via activation of the locking mechanism. As another example, the smart sensor device 700 may be magnetically affixed to its base, allowing for varied orientation of the sensor device 700. It should be understood that in other embodiments, the smart sensor device 700 may instead include a fixed base (e.g., that is not adjustable).

Figure 8:
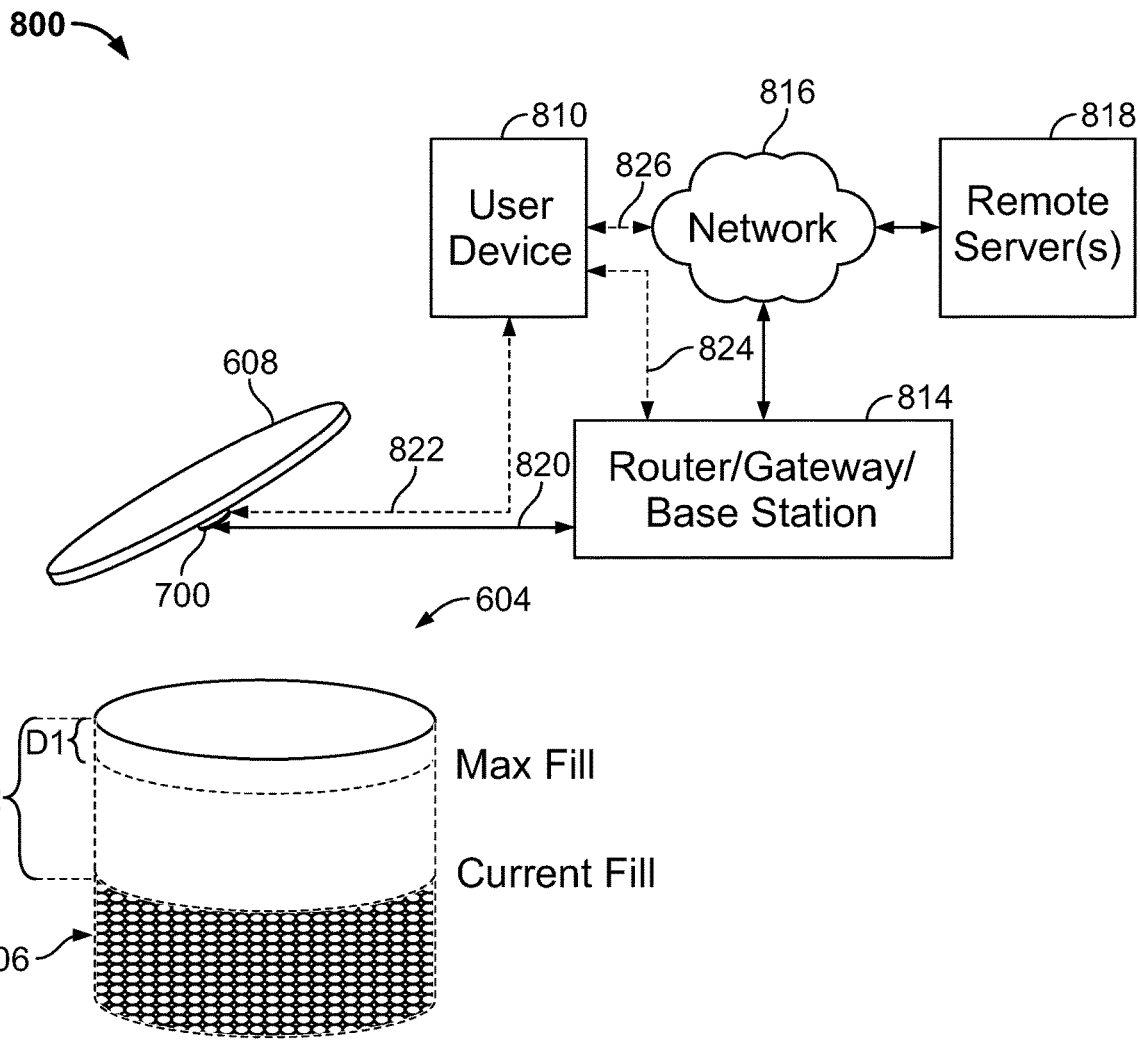
FIG. 8 is a block diagram of an example embodiment of a brine tank having a smart sensor attached to its cover, the smart sensor being communicatively coupled to a user device and/or a remote server directly, through a router, gateway, or base station, and/or through a communications network.

FIG. 8 shows an example of a communication system 800 through which the smart sensor device 700 may communicate with a user device 810 and/or one or more remote servers 818. The smart sensor device 700 may establish a wireless connection 820 to a router, gateway, or base station 814 using its wireless transceiver 702. The router, gateway, or base station 814 may be communicatively coupled to a network 816, which may be wide area network (WAN), such as the public internet. The remote server 818 may be connected to the network 816. In some embodiments the remote server 818 may be a physical server connected to the network 816, while in other embodiments the remote server 818 may be a cloud server that is implemented through server virtualization across multiple physical systems connected to the network 816. The user device 810 may be a portable electronic device (e.g., a smart phone or tablet device) that may be have established wireless communication connections 822, 824, and 826 with one or more of the smart sensor device 700, the router, gateway, or base station 814, and the network 816, respectively. For example, the connection 822 may be a personal area network connection (e.g., implemented according to a BlueTooth™ standard) between the user device 810 and the wireless transceiver 702 of the smart sensor device 700. The connection 824 may be a local area network connection (e.g., implemented according to a WiFi™ standard) between the user device 810 and the router, gateway, or base station 814. The connection 826 may be a mobile device network connection (e.g., implemented according to a GSM™/EDGE, UMTS/HSPA or WiMAX standard) between the user device 810 and the network 816.

It may be desirable for the smart sensor device 700 to be applied to a variety of models of water softener brine tanks. However, such tanks may vary in capacity and/or dimension across different models and manufacturers. Thus, in order to account for differences between various styles of water softener brine tanks, the smart sensor device 700 may undergo initial and periodic calibrations. Generally, these calibrations may be performed by acquiring first and second distance measurements, requesting and receiving user input defining at least one fill ratio (e.g., a user-defined ratio) corresponding to the first and second distance measurements, and using the fill ratio as a basis (e.g., via interpolation or extrapolation) for calculating fill ratios for the salt 606 of the brine tank 604 as the monitored salt level fluctuates as salt is used up in the operation of the water softener system and is (unpredictably) added by a person maintaining the water softener system.

In an embodiment (e.g., corresponding to the method of FIG. 11, described below), calibration data for the smart sensor device 700 may be obtained by capturing a first distance measurement when the cover 608 is closed to identify a distance D2 corresponding to the distance between the cover 608 and the current level of the salt 606 in the brine tank 604. The first distance measurement may be stored in local memory of the user device 810 or may be sent to and stored at the remote server 818 by the smart sensor device 700 through the router, gateway, or base station 814 and the network 816. Once the first distance measurement has been stored, the smart sensor 700, the remote server 818, and/or a software application running on the user device 810 may cause a prompt to be sent to the user device 810, requesting that the user input a first fill ratio of the current fill level of the tank 604 to the maximum fill level. The first fill ratio provided by the user may be stored in local memory of the user device 810, or may sent to and stored at the remote server 818 by the user device 810 through the network 816 and/or the router, gateway, or base station 814. A prompt may then be sent to the user device 810 requesting that salt be added to the tank 604. A second distance measurement may be obtained by the smart sensor 700 when the cover 608 is closed after salt has been added to identify a new distance between the new salt level and the cover 608 (e.g., distance D1 if the user fills the tank 604 all the way to the maximum fill line). Once the second distance measurement has been stored, the smart sensor 700, the remote server 818, and/or a software application running on the user device 810 may cause a prompt to be sent to the user device 810, requesting that the user input a second fill ratio of the new fill level of the tank 604 to the maximum fill level. The second fill ratio provided by the user may be stored in local memory of the user device 810, or may sent to and stored at the remote server 818 by the user device 810 through the network 816 and/or the router, gateway, or base station 814. Calibration data stored at the remote server 818 may include the first distance measurement, the second distance measurement, the first fill ratio, and the second fill ratio.

Figure 9:
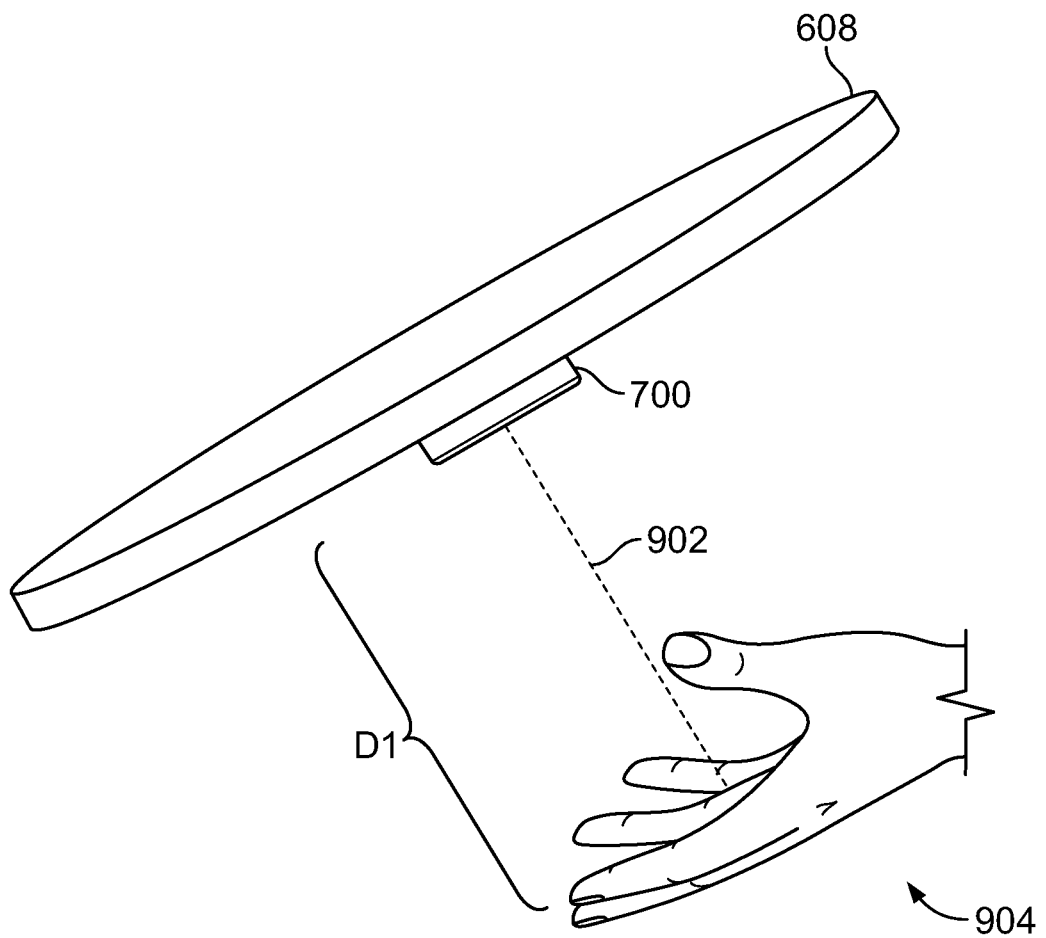
FIG. 9 is a diagram of an example embodiment showing the calibration of a smart sensor.

In another embodiment (e.g., corresponding to the method of FIG. 10, described below) in which calibration does not require the addition of salt to the tank 604 by the user, the smart sensor 700 may obtain a first distance measurement when the cover 608 is closed to identify the distance D2. The first distance measurement may be stored in local memory of the user device 810 or may be sent to and stored at the remote server 818 by the smart sensor device 700 through the router, gateway, or base station 814 and the network 816. Once the first distance measurement has been stored, the smart sensor 700, the remote server 818, and/or a software application running on the user device 810 may cause a prompt to be sent to and displayed by the user device 810, requesting that the user input a fill ratio of the current fill level of the tank 604 to the maximum fill level. The fill ratio provided by the user may be stored in local memory of the user device 810, or may sent to and stored at the remote server 818 by the user device 810 through the network 816 and/or the router, gateway, or base station 814. The smart sensor 700, the remote server 818, or the software application running on the user device 810 may then cause a prompt to be sent to and displayed by the user device 810, the prompt requesting that the user manually position an object (e.g., a book or a hand of the user) along the principal axis of the smart sensor device 700 at a distance away from the cover 608 corresponding to the distance D1. An example of this arrangement is shown in FIG. 9 in which a hand 904 is placed along the principal axis 902 of the smart sensor device 700 at a distance D1. The user may confirm via input to the user device 810 that the manually positioned object is in place at the requested distance. The user device 810 may cause notification of this confirmation to be sent to the smart sensor device 700 (e.g., directly or through communication with the remote server 818), in response to which the smart sensor device 700 may capture a second distance measurement corresponding to the distance D1. The second distance measurement may be stored in local memory of the user device 810 or may be sent to and stored at the remote server 818 by the smart sensor device 700 through the router, gateway, or base station 814 and the network 816. The second distance measurement may be assumed to correspond to a 100% fill ratio, and therefore should not require a corresponding user-defined fill ratio to be obtained. Calibration data stored at the remote server 818 may include the first distance measurement, the second distance measurement, and the fill ratio.

In either embodiment, once calibration data has been acquired for the smart sensor device 700, the smart sensor device 700 may periodically capture new distance measurements to monitor the fill level of the tank 604. These new distance measurements may be provided by the smart sensor device 700 and/or the user device 810 to the remote server 818 through the network 816. The remote server 818 may analyze the new distance measurements to automatically determine a new fill ratio for the tank 604 based on the calibration data. For example, the remote server 818 may perform interpolation or extrapolation of the calibration data to determine the new fill ratio. If the remote server 818 determines that the new fill ratio is below a predetermined threshold value, the remote server 818 may cause an alert to be sent to the user device 810. The alert may indicate that the salt level of the tank 604 is low and may recommend that additional salt be added to the container. If the remote server 818 detects that salt has been added to the tank 604 (i.e., if the new fill ratio is determined to be greater than a previous fill ratio stored in a memory of the remote server 818), the remote server 818 may cause an alert to be sent to the user device 810. The alert may recommend recalibrating the smart sensor device 700. In some embodiments, this recalibration may be the same as the initial calibration described above. In other embodiments, the recalibration may be performed by displaying a prompt at the user device 810 requesting that the user input the amount of salt added to the tank 604, the fill ratio prior to the salt being added, and, optionally, the fill ratio subsequent to the addition of the salt.

In order to conserve battery life and because salt is not generally used up rapidly by water softener systems, the smart sensor device 700 may only need to capture new distance measurements fairly infrequently (e.g., once per day) in some embodiments.

For embodiments in which the smart sensor device 700 includes an image sensor, post-processing may be performed on images captured by the smart sensor device 700 by a processor of the smart sensor device 700, the user device 810, or the remote server 818 in order to translate each image into a distance measurement. For example, machine learning architectures, such as deep neural networks, may be applied by the remote server 818 to translate a captured image into a distance measurement or, optionally, directly to a fill ratio based on the calibration data.

Alternatively, default calibration data (e.g., which may be generated in advance via factory testing) may be stored on a memory device of the smart sensor device 700, the user device 810, or the remote server 818. The default calibration data may be used by the processor as a basis for initially estimating the distance between the sensor device 700 and the salt in the brine tank 604 based on one or more captured images of the interior of the brine tank 604.

In some embodiments, the calibration data may be updated by comparing user-reported fill levels of the brine tank 604 to estimated fill levels determined by the processor based on distance measurements derived from images captured by the smart sensor device 700. For example, a captured image of the interior of the brine tank 604 produced by the image sensor of the smart sensor device 700 may be processed by the processor to produce an estimated fill level of the brine tank 604. The user may then be prompted (e.g., via the user device 810) to provide a user-reported fill level of the brine tank 604. The processor may then calculate the mean square error between estimated fill level and the user-reported fill level, and may adjust the calibration data to correct for the mean square error so that future fill-level estimations and distance measurements determined based on the calibration data may be more accurate.

When a user adds salt to the brine tank 604, the resultant mass of salt may sometimes have an uneven top surface. For example, the salt may accumulate unevenly such that some regions of the top surface of the mass of salt may be higher than others. In order to more accurately the fill level of the brine tank 604 in these scenarios, the sensors 706 may include an array (e.g., a 2×2 array or a 3×3 array) of infrared distance sensors, and/or ultrasound distance sensors, so that distances between the cover 608 and the top surface of the mass of salt may be measured at multiple different locations. The distance measurements produced by the sensors 706 may be averaged together (e.g., by the processor) to produce an average distance measurement. The average distance measurement may then be used by the processor as a basis for estimating the fill level of the brine tank 604.

Figure 10:
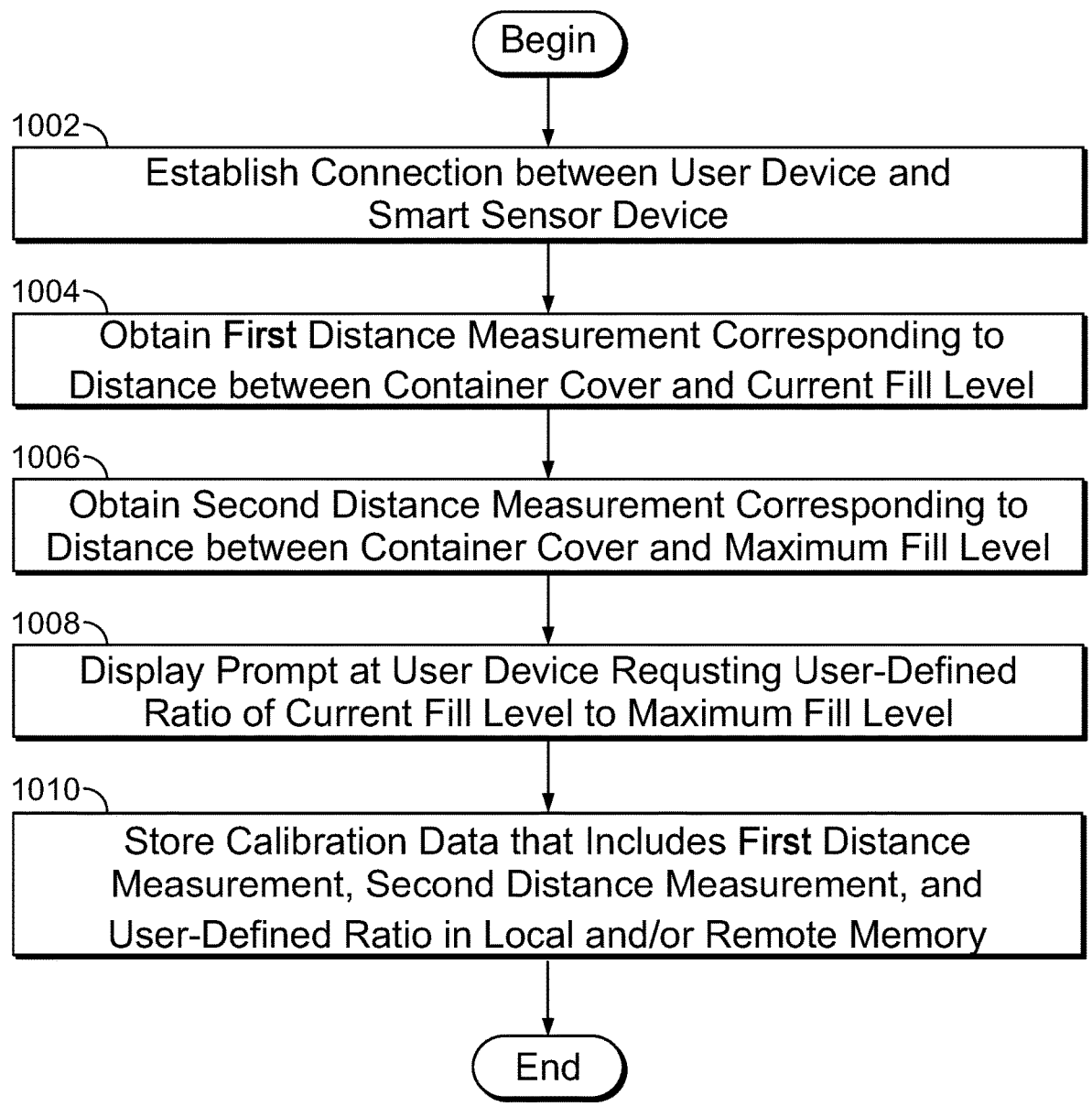
FIG. 10 is a flow chart of an example embodiment of a method of calibrating a smart sensor for a brine tank.

FIG. 10 shows an illustrative method by which a smart sensor device (e.g., the smart sensor device 700 FIGS. 6-9) may be calibrated to capture measurements corresponding to the salt level of a brine tank (e.g., brine tank 604, FIGS. 6-8), and by which corresponding calibration data may be stored in a local or remote memory device.

At step 1002, a connection for communication between a user device (e.g., user device 810, FIG. 8) and the smart sensor device is established. This connection may be a direct connection (e.g., via Bluetooth™) or may be made through a LAN or WAN (e.g., network 816 and/or router, gateway, or base station 814, FIG. 8).

At step 1004, the smart sensor device may obtain a first distance measurement corresponding to a distance (e.g., distance D2) between a container cover of the brine tank and a current fill level of the salt in the brine tank.

At step 1006, the smart sensor device obtains a second distance measurement corresponding to a distance between the container cover and a maximum fill level of the brine tank. For example, a prompt may be displayed at the user device that instructs the user to place an object such as a book or a person's hand along the principal axis of the image sensor or distance sensor of the smart sensor device at a distance equal to the distance between the container cover and the maximum fill level of the brine tank when the cover is in position over the brine tank. The user may confirm via input to a user interface of the user device that the object is in place at the requested distance. The user device may send a notification of this confirmation to the smart sensor device directly or through a remote server that is connected to and configured to control the smart sensor device. In response to receiving the notification, the smart sensor device may obtain a second distance measurement corresponding to the distance between the container cover and the maximum fill level of the brine tank.

At step 1008, a prompt is displayed at the user device requesting the input of a user-defined fill ratio of the current fill level of the brine tank to the maximum fill level of the brine tank.

At step 1010, calibration data may be stored in local memory of the user device or may be sent through a LAN or WAN to be stored at a remote memory (e.g., of the remote server). The calibration data may include the first distance measurement, the second distance measurement, and the user-defined fill ratio. The first distance measurement and first user-defined fill ratio and the second distance measurement and a 100% fill ratio may be considered as two data points, which may subsequently serve as the basis for interpolation or extrapolation when the remote server determines a new fill ratio of the brine tank (corresponding to a ratio the current fill level of the brine tank to the maximum fill level of the brine tank) based on new distance measurements and the calibration data.

In the above example, prompts displayed at the user device may be generated by the remote server and sent to the user device, or may be generated by a software application running on the user device in response to instructions received from the remote server or stored on a local memory device of the user device.

Figure 11:
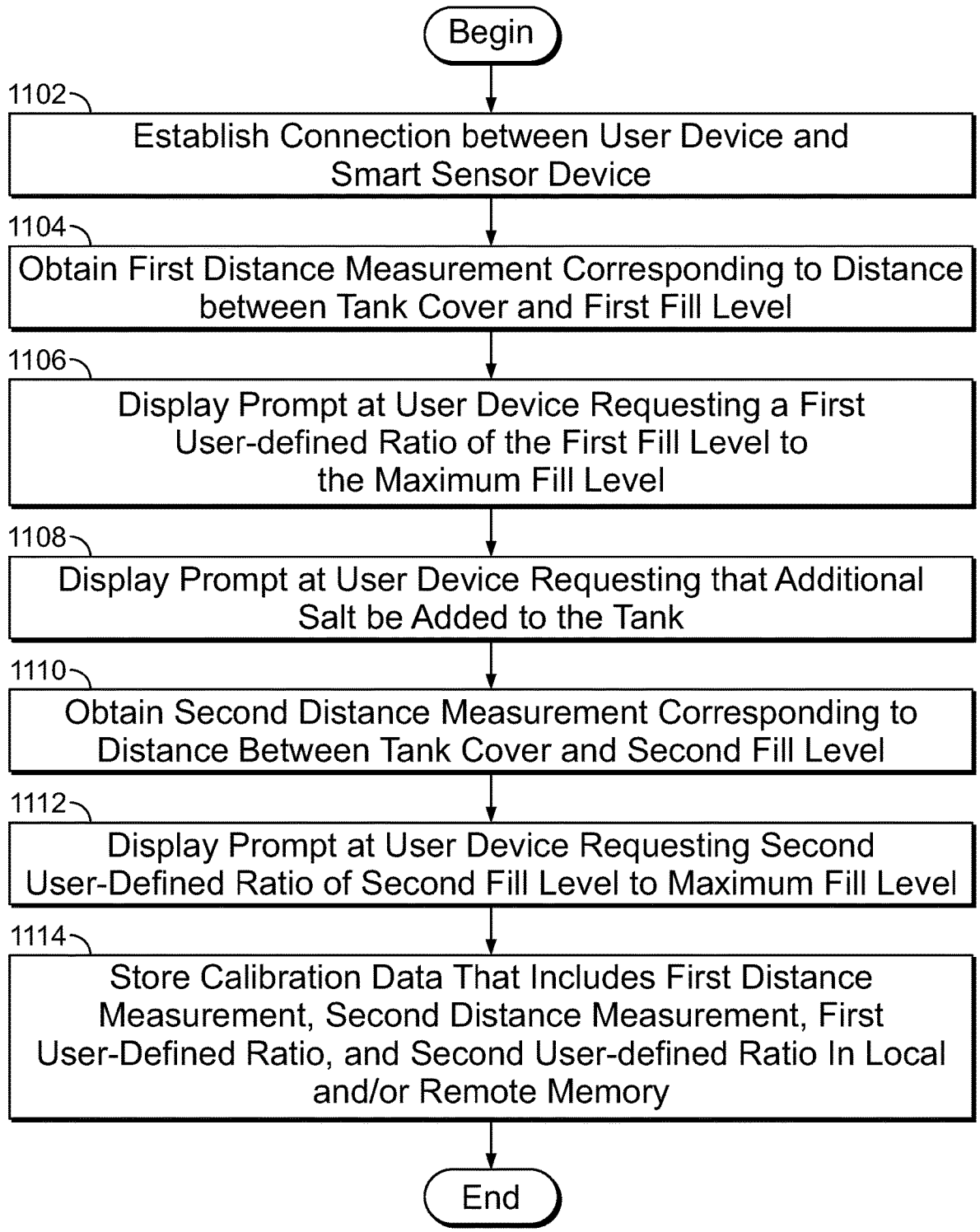
FIG. 11 is a flow chart of an example embodiment of a method of calibrating a smart sensor for a brine tank.

FIG. 11 shows an illustrative method by which a smart sensor device (e.g., the smart sensor device 700 FIGS. 6-9) may be calibrated to capture measurements corresponding to the salt level of a brine tank (e.g., brine tank 604, FIGS. 6-8), and by which corresponding calibration data may be stored in a local or remote memory device.

At step 1102, a connection for communication between a user device (e.g., user device 810, FIG. 8) and the smart sensor device is established. This connection may be a direct connection (e.g., via Bluetooth™) or may be made through a LAN or WAN (e.g., network 816 and/or router, gateway, or base station 814, FIG. 8).

At step 1104, the smart sensor device may obtain a first distance measurement corresponding to a distance (e.g., distance D2) between a container cover of the brine tank and a current fill level of the salt in the brine tank.

At step 1106, a prompt is displayed at the user device requesting the input of a first user-defined fill ratio of the first fill level of the brine tank to the maximum fill level of the brine tank.

At step 1108, a prompt is displayed at the user device requesting that salt be added to the brine tank.

At step 1110, after confirming that salt has been added to the brine tank, the salt in the brine tank is assumed to be at a second fill level that is different from the first fill level and the smart sensor device obtains a second distance measurement corresponding to a distance between the container cover and the second fill level.

At step 1112, a prompt is displayed at the user device requesting the input of a second user-defined fill ratio of the second fill level of the brine tank to the maximum fill level of the brine tank.

At step 1114, calibration data may be stored in local memory of the user device or may be sent through a LAN or WAN to be stored at a remote memory (e.g., of the remote server). The calibration data may include the first distance measurement, the second distance measurement, the first user-defined fill ratio, and the second user-defined fill ratio. The first distance measurement and first user-defined fill ratio and the second distance measurement and second user-defined fill ratio may be considered as two data points, which may subsequently serve as the basis for interpolation or extrapolation when the remote server determines a new fill ratio (e.g., corresponding to a current fill level of the brine tank to the maximum fill level of the brine tank) of the brine tank based on a new distance measurement and the calibration data.

In the above example, prompts displayed at the user device may be generated by the remote server and sent to the user device, or may be generated by a software application running on the user device in response to instructions received from the remote server or stored on a local memory device of the user device.

Figure 12:
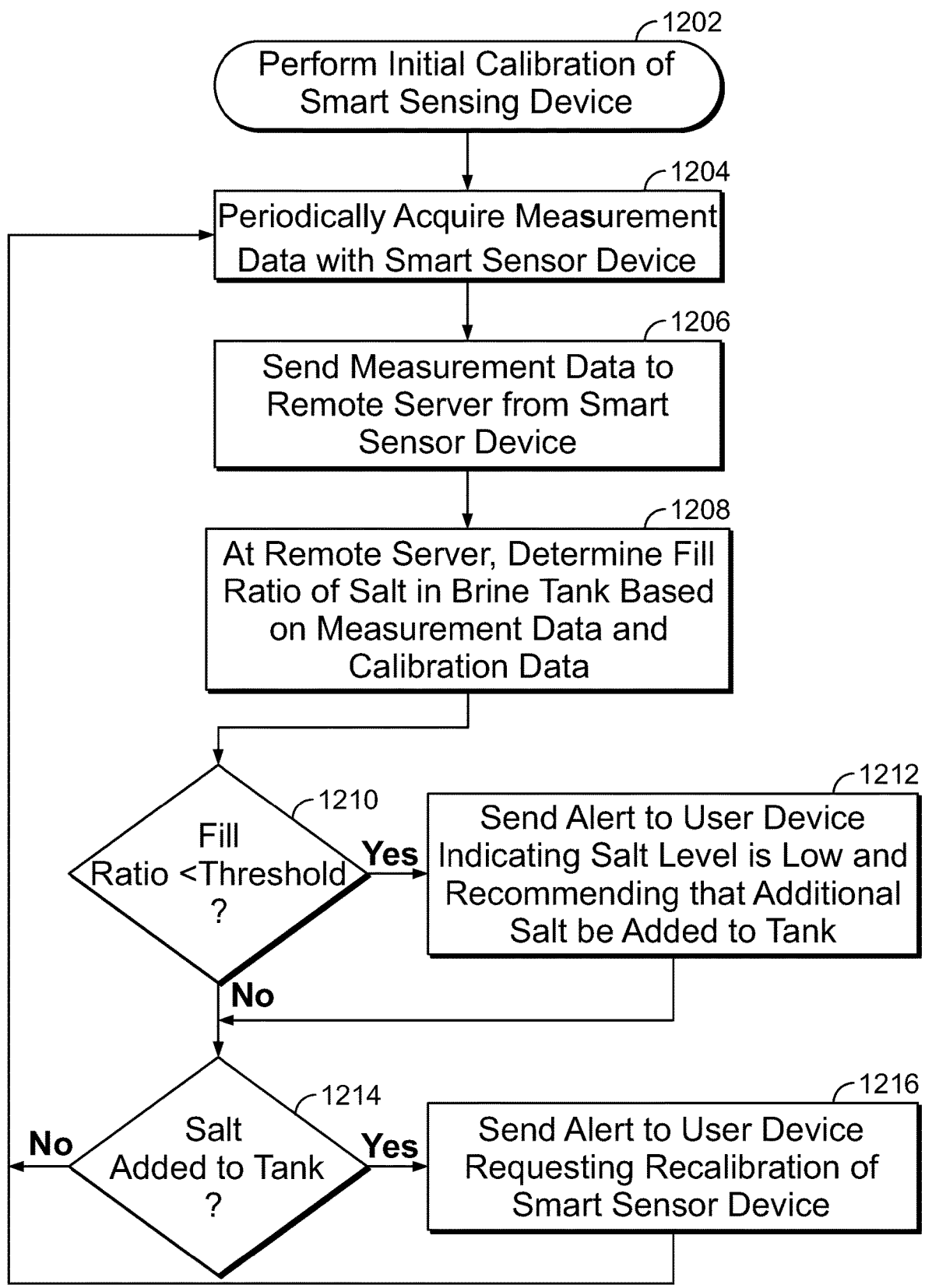
FIG. 12 is a flow chart of an example embodiment of a method of determining the salt level in a brine tank with a smart sensor, alerting a user device when the salt level is low, and alerting a user device when conditions indicate that the smart sensor should be recalibrated.

FIG. 12 shows a method by which the salt fill level of a brine tank may be periodically determined (e.g., as a ratio of the current fill level of the brine tank to a maximum fill level of the brine tank) based on distance measurements made with a calibrated smart sensor device and, based on these periodic distance measurements and corresponding determined fill ratios, a user device may be alerted when the salt level of the brine tank is too low and when the smart sensor device should be recalibrated.

At step 1202, an initial calibration of the smart sensor device is performed (e.g., according to either the method of FIG. 10 or the method of FIG. 11). Corresponding calibration data may be stored at a memory device of a remote server.

At step 1204, the smart sensor device periodically acquires measurement data (e.g. including first, second, third, . . . , nth distance measurements) corresponding to the salt fill level in the brine tank.

At step 1206, the measurement data is sent to the remote server from the smart sensor device. For example, the measurement data may be transmitted to the remote server through a wireless connection between the smart sensor device and a router, gateway, or base station and through a WAN such as the public internet.

At step 1208, the remote server determines a current fill ratio of the salt in the brine tank based on the measurement data and on the stored calibration data. For example, the stored calibration data may include two data points corresponding to two distance measurements made at step 1202 and one or more fill ratios which may be user defined, and the remote server may determine the current fill ratio by performing interpolation or extrapolation of the calibration data based on the measurement data. Alternatively, machine learning techniques (e.g., deep neural networks) may be executed by the remote server to determine the current fill ratio based on the calibration data.

At step 1210, the remote server compares the current fill ratio to a predetermined threshold value and determines whether the current fill ratio exceeds the predetermined threshold value. If so, the method proceeds to step 1212. Otherwise the method proceeds to step 1214.

At step 1212, the remote server causes an alert to be sent to a user device associated with the smart sensor device (e.g., the association corresponding to a linking of the smart sensor device and the user device to a user account that is hosted in a database of the remote server). The alert may indicate (e.g., at a user interface shown on an electronic display of the user device) that the salt level of the brine tank is low, and may recommend that additional salt be added to the brine tank.

At step 1214, the remote server determines if salt has been added to the brine tank. For example, the remote server may compare the current fill ratio to a previous fill ratio and, if the current fill ratio is higher than the previous fill ratio, the remote server may determine that salt has been added to the brine tank. If salt has been added to the brine tank, the method proceeds to step 1216. Otherwise the method returns to step 1204, forming an iterative loop.

At step 1216, the remote server causes an alert to be sent to the user device requesting recalibration of the smart sensor device. The requested recalibration may involve the repetition of step 1202, for example. As another example, the requested recalibration may involve displaying prompts at the user device requesting the input of information corresponding to how much salt was added to the brine tank, what the salt level was before salt was added to the brine tank, and what the salt level is after salt has been added to the brine tank. The method then returns to step 1204, forming an iterative loop.

In the above example, prompts displayed at the user device may be generated by the remote server and sent to the user device, or may be generated by a software application running on the user device in response to instructions received from the remote server or stored on a local memory device of the user device.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A system for monitoring the salt level of a brine tank, the system comprising:
a water softener system comprising:
a brine tank including a cover;
a sensor device attached to an interior of the cover of the brine tank, the sensor device comprising:
a sensor configured to measure distance along a principal axis, and
a wireless transceiver configured to communicatively connect to a user device and a gateway device; and
a remote server configured to communicatively connect to the user device and to the wireless transceiver of the sensor device through the gateway device;
the user device comprising a processor configured to execute instructions for:
performing a calibration to account for a capacity of the brine tank, the calibration comprising:
receiving, from the sensor device, a first distance measurement corresponding to a first fill level of the brine tank,
after the first distance measurement has been received, requesting salt be added to the brine tank, and
after salt has been added to the brine tank, receiving, from the sensor device, a second distance measurement corresponding to a second fill level of the brine tank,
wherein the capacity of the brine tank is accounted for based on at least the first distance measurement, the second distance measurement, and a quantity of salt added between receiving the first distance measurement and receiving the second distance measurement.

2. The system of claim 1, wherein the processor of the remote server is further configured to execute instructions for:
receiving a third distance measurement from the sensor device, and
determining a new fill ratio for the brine tank based on the first distance measurement, the second distance measurement, and the third distance measurement.

3. The system of claim 2, wherein the processor of the remote server is further configured to execute instructions for:
determining that the new fill ratio is less than a predetermined threshold value, and
sending a prompt to the user device, the prompt requesting that salt be added to the brine tank.

4. The system of claim 2, wherein the processor of the remote server is further configured to execute instructions for:
determining that salt has been added to the brine tank, and
sending a prompt to the user device, the prompt requesting recalibration of the sensor device.

5. The system of claim 1, wherein the processor of the remote server is further configured to execute instructions for:
storing calibration data that includes the first distance measurement, and the second distance measurement.

6. The system of claim 1, wherein the sensor device further comprises:
a microcontroller electrically coupled to the sensor and the wireless transceiver; and
a memory device configured as a non-transitory computer readable medium,
wherein the microcontroller is configured to execute instructions for routing calibration data to be stored at the memory device, the calibration data including one or more of the first distance measurement, and the second distance measurement.

7. The system of claim 1, wherein the sensor is one or more of an ultrasound distance sensor, an infrared light distance sensor, or an image sensor.

8. The system of claim 1, wherein the sensor device further comprises an adjustable base configured to adjust an angle of the principal axis with respect to the interior of the cover of the brine tank.

9. The system of claim 1, wherein the sensor comprises an array of sensors, each sensor in the array of sensors being configured to measure distance and at least one of the sensors in the array of sensors being configured to measure distance along the principal axis.

10. The system of claim 9, wherein the processor of the remote server is further configured to execute instructions for averaging the distance measured by each of the sensors in the array of sensors.

11. The system of claim 1, wherein the principal axis is substantially perpendicular to the cover to which the sensor device is attached.

12. A method of monitoring the salt level of a brine tank, the method comprising:
performing a calibration to account for a capacity of the brine tank, the calibration comprising:
measuring a first distance measurement with a sensor device, the first distance measurement corresponding to a distance between a container cover of a brine tank and a first calibration fill level of salt in the brine tank;
after the first distance measurement has been measured, requesting salt be added to the brine tank, and
after salt has been added to the brine tank, measuring a second distance measurement with the sensor device, the second distance measurement corresponding to a distance between the container cover of the brine tank and a second calibration fill level of salt in the brine tank,
wherein the capacity of the brine tank is accounted for based on at least the first distance measurement, the second distance measurement, and a quantity of salt added between measuring the first distance measurement and measuring the second distance measurement;
measuring a third distance measurement with the sensor device, the third distance measurement corresponding to a distance between the container cover of the brine tank and a first current fill level of salt in the brine tank;
determining a first new fill ratio based on the calibration and the third distance measurement;
comparing the first new fill ratio to a predetermined threshold value; and
sending an alert to a user device, the user device being in communication with the sensor device, when the first new fill ratio is below the predetermined threshold value.

13. The method of claim 12, further comprising the step of sending a second alert to the user device, the second alert requesting recalibration of the sensor device.

14. The method of claim 13, wherein the second alert is sent to the user device when the first new fill ratio is above a first user-defined fill ratio.

15. The method of claim 12, further comprising the step of sending a prompt to the user device requesting that a user position an object along a principal axis of the sensor device at the second distance before the step of measuring the second distance measurement with the sensor device.

16. The method of claim 12, further comprising the step of storing at least one of the first distance measurement, the second distance measurement, or the third distance measurement at a non-transitory computer readable medium.

* * * * *